(12) United States Patent
Tamura

(10) Patent No.: US 8,263,732 B2
(45) Date of Patent: Sep. 11, 2012

(54) PHOTO-ALIGNMENT FILM AND LIQUID CRYSTAL DISPLAY ELEMENT

(75) Inventor: Norio Tamura, Ichihara (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 1042 days.

(21) Appl. No.: 11/684,836

(22) Filed: Mar. 12, 2007

(65) Prior Publication Data

US 2007/0232780 A1 Oct. 4, 2007

(30) Foreign Application Priority Data

Mar. 16, 2006 (JP) ................................ 2006-072566

(51) Int. Cl.
*C08G 69/08* (2006.01)

(52) U.S. Cl. ........ 528/310; 349/123; 349/130; 349/132; 428/1.2; 428/1.26; 525/425; 525/432; 525/435; 525/436

(58) Field of Classification Search .................. 528/310; 428/1.26, 1.2; 349/123, 130, 132; 525/435, 525/436, 421, 425, 432
See application file for complete search history.

(56) References Cited

U.S. PATENT DOCUMENTS

| | | | | |
|---|---|---|---|---|
| 6,001,277 | A | * | 12/1999 | Ichimura et al. ............ 252/299.4 |
| 2006/0142538 | A1 | * | 6/2006 | Tsutsui et al. ................ 528/310 |

FOREIGN PATENT DOCUMENTS

| | | |
|---|---|---|
| JP | 63-015827 | 1/1988 |
| JP | 01-216985 | 8/1989 |
| JP | 01-311113 | 12/1989 |
| JP | 02-160752 | 6/1990 |
| JP | 02-214762 | 8/1990 |
| JP | 03-081327 | 4/1991 |
| JP | 04-214727 | 8/1992 |
| JP | H09-080440 | 3/1997 |
| JP | H11-218765 | 8/1999 |
| JP | 2001-056469 | 2/2001 |
| JP | 2002-003454 | 1/2002 |
| JP | 2004-119080 | 4/2004 |
| JP | 2005-049835 | 2/2005 |
| JP | 2005-255981 | 9/2005 |
| JP | 2005-275364 | 10/2005 |
| JP | WO 2006068197 | 6/2006 |
| WO | 9737273 | 10/1997 |

OTHER PUBLICATIONS

Geoffrey Luckhurst and Peter Raynes "Molecular Crystals and Liquid Crystals" Proceeding of the 19th International Liquid Crystal Conference ILCC2002, Part IV of V, Taylor & Francis Group, vol. 412, Jun. 30-Jul. 5, 2004, pp. 293-299.

"Office Action of Japan Counterpart Application", issued on Nov. 15, 2011, with English translation thereof, p. 1-p. 7.

* cited by examiner

*Primary Examiner* — Gregory Listvoyb
(74) *Attorney, Agent, or Firm* — J.C. Patents

(57) ABSTRACT

[Object] To obtain an alignment film having excellent alignment stability of a liquid crystal and a high voltage holding ratio by application of linearly polarized light to a polyamic acid having a specific structure and then imidization under heat.

[Solving Means] A photo-alignment film is obtained by: applying a polyamic acid solution on a substrate, where the polyamic acid contains, in its main chain, at least a group having unsaturated groups having 1 to 3 carbon-carbon double bonds or 1 to 4 triple bonds; vaporizing a solvent from a film formed; applying linearly polarized light to the film after the vaporization of the solvent; and then heating the film to imidize the polyamic acid.

15 Claims, 4 Drawing Sheets

[FIG. 1]
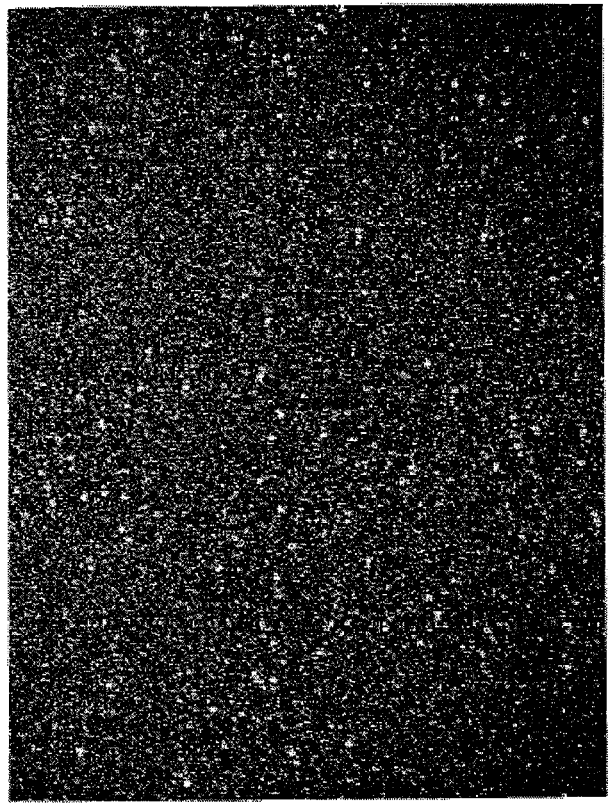
FIG. 1 POLARIZING MICROSCOPIC PHOTOGRAPH (LIQUID CRYSTAL CELL A)

[FIG. 2]
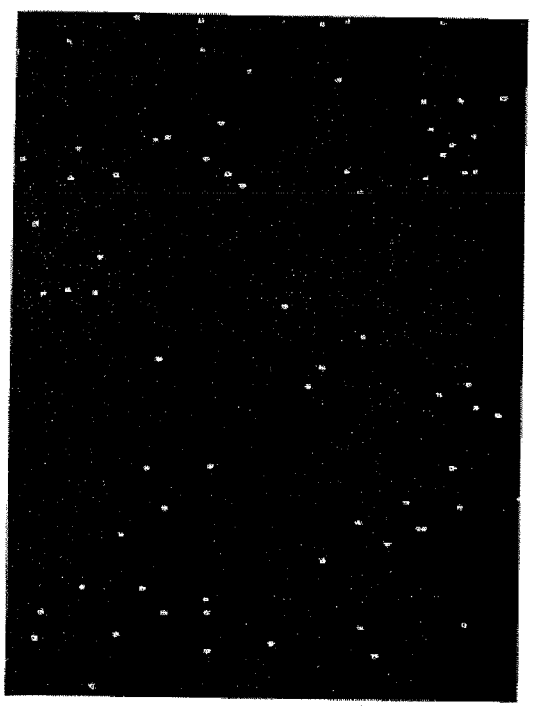
FIG. 2 POLARIZING MICROSCOPIC PHOTOGRAPH (LIQUID CRYSTAL CELL B)

[FIG. 3]
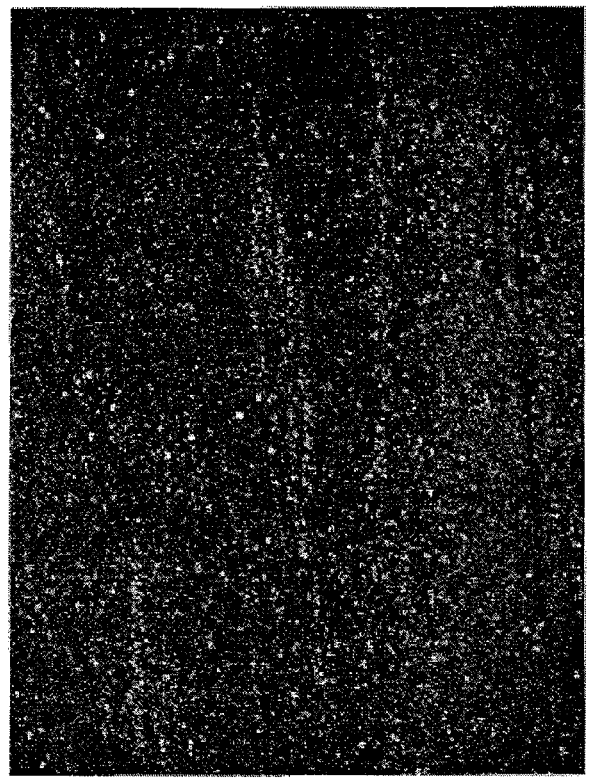
FIG. 3 POLARIZING MICROSCOPIC PHOTOGRAPH (LIQUID CRYSTAL CELL J)

[Fig. 4]
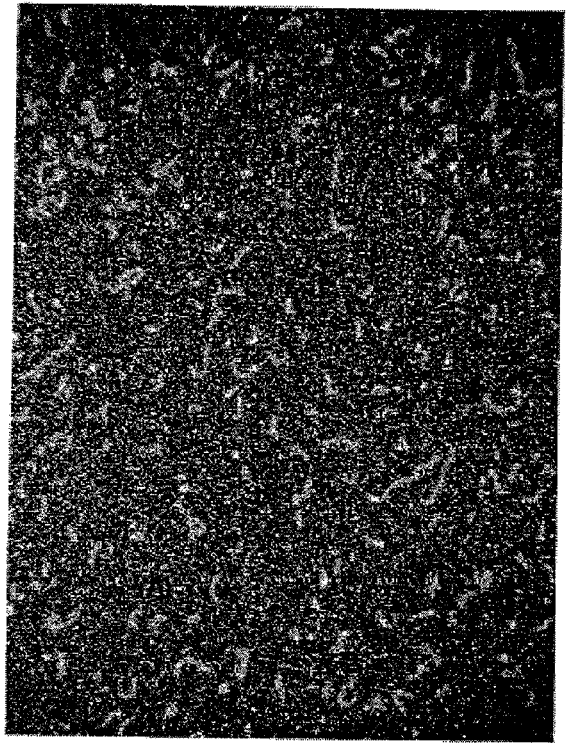
FIG. 4 POLARIZING MICROSCOPIC PHOTOGRAPH (LIQUID CRYSTAL CELL L)

PHOTO-ALIGNMENT FILM AND LIQUID CRYSTAL DISPLAY ELEMENT

TECHNICAL FIELD

The present invention relates to a photo-alignment film, a method of manufacturing the same, and a liquid crystal display element having such a photo-alignment film.

BACKGROUND ART

For fulfilling the requests for expanding or colorizing a display and improving response time as well as display qualities, such as contrast and color development, technologies have been developed from twisted nematic (TN) to super twisted nematic (STN) and further to a TFT display element having thin filmed transistors (TFTs) on respective pixels. In recent years, improvements in drive mechanisms of the TFT display elements have been progressed. To extend the viewing angle more, for instance, the in-plain switching (IPS) mode and the vertical aliment (hereinafter, abbreviated as VA) mode have been developed, and furthermore the optically compensated bend (OCB) mode having a response time capable of responding to a moving image has been developed.

From a standpoint of applications, presently, liquid crystal displays have been applied extensively from PC monitors to TV. Therefore, wider-screen displays have been demanded, while it becomes very difficult to keep constantly an image quality. In addition, according to applications on TV compared with the applications on monitors, it has been requested to prevent an image from being troubled even after driving for a long time (i.e., retaining high reliability) as the user uses it for a prolonged time.

The liquid crystal alignment film plays two roles: one for aligning a liquid crystal composition in a given direction in a liquid crystal display element; and the other for tilting the liquid crystal composition against the plane of the substrate (providing a pre-tilt angle). The slope of the liquid crystal composition against the plane of the substrate is referred to as "pre-tilt angle". In the present description, such a name will be used below. The liquid crystal alignment film is prepared using a polyimide thin film as a primary material, which has a high glass transition point (Tg) and excellent in chemical resistance and heat resistance to minimize temporal, chemical, and thermal deteriorations of the molecular alignment. The liquid crystal alignment film is provided with a polyimide thin film, which is in general obtained by applying a polyamic acid or soluble polyimide solution (hereinafter, abbreviated as "varnish") on a glass substrate with electrodes by the spinner method, printing method, or the like and heating the substrate to dehydrate polyamic acid and close the ring thereof or vaporize a solvent in the soluble polyimide solution. Further, the thin film is rubbed by cloth folded on a roller to provide the liquid crystal alignment film with uniform alignment characteristics to a liquid crystal composition.

However, the above-mentioned alignment treatment with rubbing causes several problems as described below when a liquid crystal display element is manufactured. Characteristics of a liquid crystal display element, such as a voltage holding ratio (VHR), may be decreased due to static electricity caused by rubbing operation, contaminants adsorbed on the surface of an alignment film by the static electricity, or impurities eluted from cloth by rubbing and thus the reliabilities of the display may be lowered. In addition, a larger-sized display may generate an area where the rubbing cloth does not contact with the liquid crystal alignment film in the case of deforming a substrate while rubbing thereof. In contrast, a high quality display having small-sized pixels leads to a large difference of elevation between the electrodes, so it may result in display irregularity due to a difficulty in uniform alignment treatment.

Methods for noncontact alignment treatment using light or charged particles (so-called rubbingless) have been demanded. However, these methods may result in insufficient alignment properties of liquid crystals in practical use. In addition, the characteristics, such as VHR, may deteriorate because of attributing to materials or the treatment.

Regarding the noncontact alignment treatment, for example, a photo-alignment film made of a polymer having a double or triple bond in main chain has been known in the art (for example, see Patent Document 1). However, even though the heat resistance of the photo-alignment film has been studied, the document does not describe the electric characteristics of a prepared alignment film. Thus, needs more consideration for other characteristics, such as VHR, for the dependability of the liquid crystal display element still remain.

Further, for the noncontact alignment treatment, it is known that a film having extremely excellent alignment properties can be obtained by irradiating light on a polyamic acid having azobenzene as a main chain of the polyamic acid before imidization and then imidizing the polyamic acid (for example, see Non-Patent Document 1). However, the document does not describe electric properties of an alignment film prepared.

[Patent Document 1] JP 11-15001 A
[Non Patent Document 1] Mol. Cryst. Liq. Cryst. Vol. 412, 293 (2004)

DISCLOSURE OF INVENTION

Problem to be Solved by the Invention

An object of the present invention is to provide a photo-alignment film having good alignment properties and electric properties, such as VHR, durable to practical use.

Means for Solving Problem

The present inventors have intensively advanced the research and development of a photo-alignment film and finally found out that a photo-alignment film having a high voltage holding ratio as well as an excellent alignment stability of a liquid composition when it is used for a liquid crystal alignment film can be obtained such that a polyamic acid is formed using at least tetracarboxylic acid dianhydride and diamine as a raw material, where at least one of or each of the tetracarboxylic acid dianhydride and the diamine is a compound having a group containing an unsaturated bond, such as 1 to 3 carbon-carbon bonds or 1 to 4 triple bonds, provided as component A of the tetracarboxylic acid dianhydride or the diamine; and a polyamic acid film, in which the group containing an unsaturated bond is introduced in the main chain thereof, is then subjected to light irradiation, followed by imidization. Consequently, the inventors have completed the present invention.

The configuration of the present invention includes the following.

[1] A photo-alignment film, which is formed by imidization after alignment of a polyamic acid generated using at least a diamine and a tetracarboxylic acid dianhydride as raw materials by light irradiation in a predetermined direction, wherein: the diamine comprises one or two or more diamines containing an unsaturated bond each represented by a general formula (1) described below as component A of the diamine; the tetracarboxylic acid dianhydride comprises one or two or more tetracarboxylic acid dianhydrides containing an unsaturated bond each represented by a general formula (2) described below as component A of the tetracarboxylic acid dianhydride; or the diamine comprises the one or two or more diamines containing an unsaturated bond as component A of the diamine, and the tetracarboxylic acid dianhydride comprises the one or two or more tetracarboxylic acid dianhydrides containing an unsaturated bond as component A of the tetracarboxylic acid dianhydride.

$$H_2N\text{-}A^1\text{-}T\text{-}A^2\text{-}NH_2 \tag{1}$$

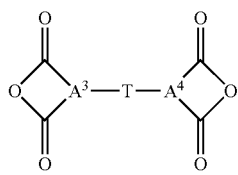
(2)

In the formula (1), $A^1$ and $A^2$ each independently represent a divalent organic group and T represents a divalent group comprising an unsaturated bond containing 1 to 3 carbon-carbon double bonds or 1 to 4 triple bonds. In addition, in the formula (2), $A^3$ and $A^4$ each independently represent a trivalent organic group, and T represents a divalent group comprising an unsaturated bond containing 1 to 3 carbon-carbon double bonds or 1 to 4 triple bonds.

[2] The photo-alignment film according to the above item [1], wherein the diamine containing an unsaturated bond is a diamine where $A^1$ and $A^2$ in the general formula (1) each independently represent an aromatic ring having 6 to 20 carbon atoms, an alicyclic group having 3 to 10 carbon atoms, or an alkylene group having 1 to 10 carbon atoms and each may contain an oxy group and a carbonyl group, and T represents any group containing an unsaturated group selected from the group consisting of the following formulae (A) to (G):

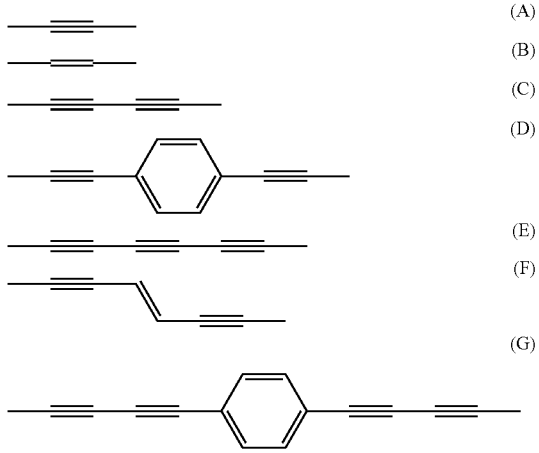

[3] The photo-alignment film according to the above item [1] or [2], wherein the tetracarboxylic acid dianhydride containing an unsaturated bond is a tetracarboxylic acid dianhydride where $A^3$ and $A^4$ in the general formula (2) each independently represent an aromatic ring having 6 to 20 carbon atoms or an aliphatic group having 1 to 20 carbon atoms and each may contain an oxy group and a carbonyl group, and T represents any group containing an unsaturated group selected from the group consisting of the formulae (A) to (G).

[4] The photo-alignment film according to any one of the above item [1] to [3], wherein the diamine further comprises one or two or more diamines represented by a general formula (3) described below as component B of the diamine.

$$H_2N\text{—}R^1\text{—}NH_2 \tag{3}$$

In the general formula (3), $R^1$ represents a divalent organic group selected from the groups represented by general formulae (5) to (8) described below.

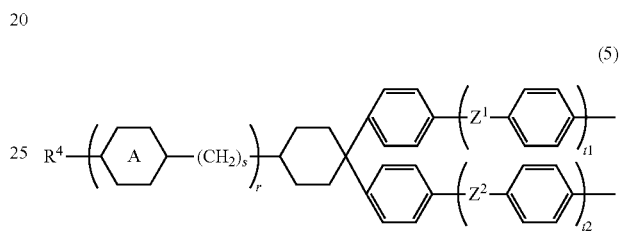
(5)

In the general formula (5), $R^4$ represents H or an alkyl group having 1 to 12 carbon atoms, rings A each independently represent 1,4-phenylene or 1,4-cyclohexylene, $Z^1$ and $Z^2$ each independently represent a single bond, $CH_2$, $CH_2CH_2$, or O, r represents an integral number of 0 to 3, S's each independently represent an integral number of 0 to 5, t1 represents an integral number of 0 to 3, and t2 represents an integral number of 0 to 3, and any H of 1,4-phenylene or 1,4-cyclohexylene may be substituted with an alkyl group having 1 to 4 carbon atoms.

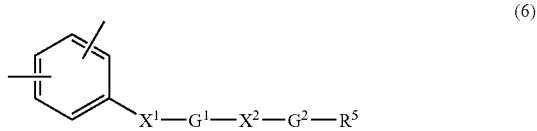
(6)

In the general formula (6), $X^1$ and $X^2$ each represent a single bond, O, COO, OCO, NH, CONH, or an alkylene group having 1 to 12 carbon atoms, $G^1$ and $G^2$ each represent a single bond or a divalent group containing 1 to 3 rings selected from an aromatic ring and an alicyclic ring, and $R^5$ represents H, F, CN, OH, or an alkyl, perfluoroalkyl, or alkoxy group having 1 to 30 carbon atoms, a binding position of a substituent and positions of two free radicals to a benzene ring are arbitrary positions provided that, when $G^2$ is a single bond and $X^2$ is neither a single bond nor an alkylene group, $R^5$ is H or the alkyl group and when both $G^1$ and $G^2$ are single bonds, the total carbon atoms of $X^1$, $X^2$, and $R^5$ is 3 or more.

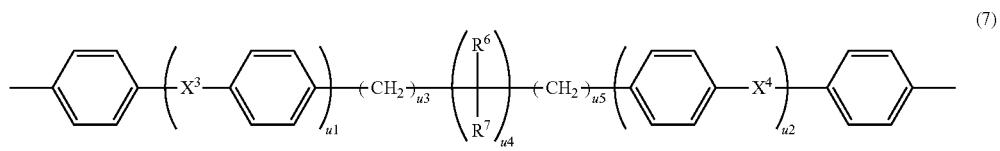
(7)

In the general formula (7), $X^3$ and $X^4$ each independently represent a single bond, $CH_2$, $CH_2CH_2$, or O, $R^6$ and $R^7$ each independently represent H, an alkyl group having 1 to 12 carbon atoms, or a perfluoroalkyl group having 1 to 12 carbon atoms, u1, u2, u3, u4, and u5 each independently represent an integral number of 0 to 3, and any H of 1,4-phenylene may be substituted with an alkyl group having 1 to 4 carbon atoms.

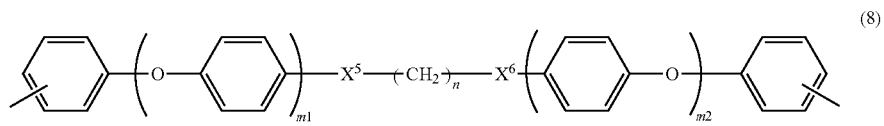
(8)

In the general formula (8), $X^5$ and $X^6$ each independently represent a single bond, O, or S, m1 and m2 each independently represent an integral number of 0 or 1, and n represents an integral number of 0 to 10, and binding positions of a substituent and two free radicals to a benzene ring are an arbitrary positions.

[5] The photo-alignment film according to any one of the above item [1] to [4], wherein the tetracarboxylic acid dianhydride further comprises one or two or more tetracarboxylic acid dianhydrides each represented by a general formula (4) described below as component B of the tetracarboxylic acid dianhydride.

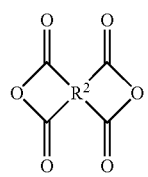
(4)

In the general formula (4), $R^2$ represents a tetravalent group selected from groups represented by the general formulae (9) to (17) described below.

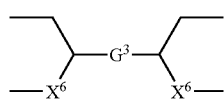
(9)

In the general formula (9), $G^3$ represents a single bond, an alkylene group having 1 to 12 carbon atoms, 1,4-phenylene, or 1,4-cyclohexylene, and $X^6$'s each independently represent a single bond or $CH_2$.

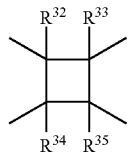
(10)

In the general formula (10), $R^{32}$, $R^{33}$, $R^{34}$, and $R^{35}$ each independently represent H, or a methyl, ethyl, or phenyl group.

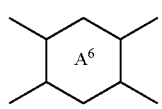
(11)

In the general formula (11), a ring $A^6$ represents a cyclohexane ring or a benzene ring.

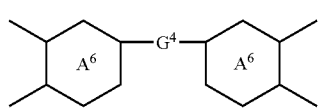
(12)

In the general formula (12), $G^4$ represents a single bond, $CH_2$, $CH_2CH_2$, O, CO, S, C $(CH_3)_2$, or C $(CF_3)_2$, and rings $A^6$ each independently represent a cyclohexane ring or a benzene ring.

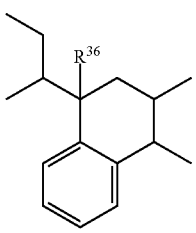
(13)

In the general formula (13), $R^{36}$ represents H or a methyl group.

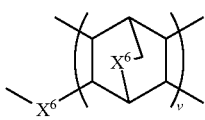
(14)

In the general formula (14), $X^6$'s each independently represent a single bond or $CH_2$, and v represents 1 or 2.

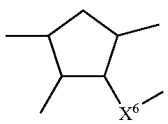
(15)

In the general formula (15), $X^6$ represents a single bond or $CH_2$.

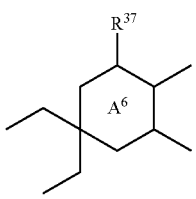
(16)

In the general formula (16), $R^{37}$ represents H, or a methyl, ethyl, or phenyl group, and a ring $A^6$ represents a cyclohexane ring or a benzene ring.

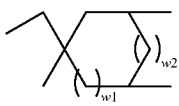
(17)

In the general formula (17), w1 and w2 each independently represent 0 or 1 provided that there is no case that satisfies both w1=1 and w2=0 at once.

The photo-alignment film according to the above item [2], wherein $A^1$ and $A^2$ of the general formula (1) are independently selected from the group consisting of structural formulae (I) to (V) described below and general formulae (VI) and (VII) described below.

In the general formula (VI) or (VII), n represents an integral number of 1 to 10.

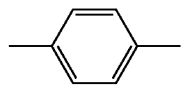
(I)

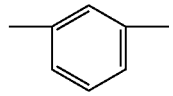
(II)

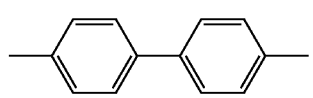
(III)

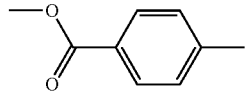
(IV)

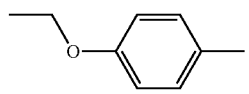
(V)

—$C_nH_{n+1}$— (VI)

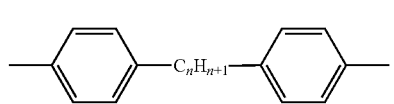
(VII)

[7] The photo-alignment film according to the above item [3], wherein $A^3$ and $A^4$ of the general formula (2) are independently selected from the group consisting of structural formulae (VIII) to (X) described below.

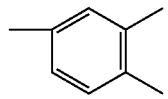
(VIII)

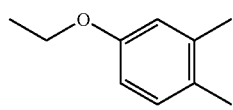
(IX)

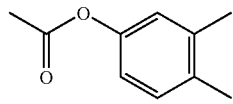
(X)

[8] The photo-alignment film according to the above item [6], wherein $A^1$ and $A^2$ of the general formula (1) are independently selected from the group consisting of the structural formulae (I), (II), and (III) and the general formulae (VI) and (VII).

[9] The photo-alignment film according to the above item [7], wherein $A^3$ and $A^4$ of the general formula (2) are each represented by the structural formula (VIII).

[10] The photo-alignment film as descried in any one of the above items [1] to [9], wherein a molar ratio of the tetracarboxylic acid dianhydride containing an unsaturated bond and the diamine containing an unsaturated bond to the total amount of the raw materials of the polyamic acid is 0.3 to 1.0.

[11] A photo-alignment film, which is formed by imidization after alignment of a polyamic acid generated using at least a diamine and a tetracarboxylic acid dianhydride as raw materials by light irradiation in a predetermined direction, wherein: the diamine and the tetracarboxylic acid dianhydride comprise one or both of one or two or more diamines selected from the group consisting of structural formulae (1-1) to (1-11) described below as the component A of the diamine as the diamine and one or two or more tetracarboxylic acid dianhydrides selected from the group consisting of structural formulae (2-1) to (2-7) described below as component A of the tetracarboxylic acid dianhydride as the tetracarboxylic acid dianhydride; and the diamine and the tetracarboxylic acid dianhydride further comprise one or both of one or two or more diamines selected from the group consisting of general formulae (3-1) and (3-3) to (3-7) described below and a structural formula (3-2) described below as component B of the diamine as the diamine and one or two or more tetracarboxylic acid dianhydrides selected from the group consisting of a general formula (4-2) described below and structural formulae (4-1) and (4-3) to (4-7) described below as the component B of the tetracarboxylic acid dianhydride as the tetracarboxylic acid dianhydride.

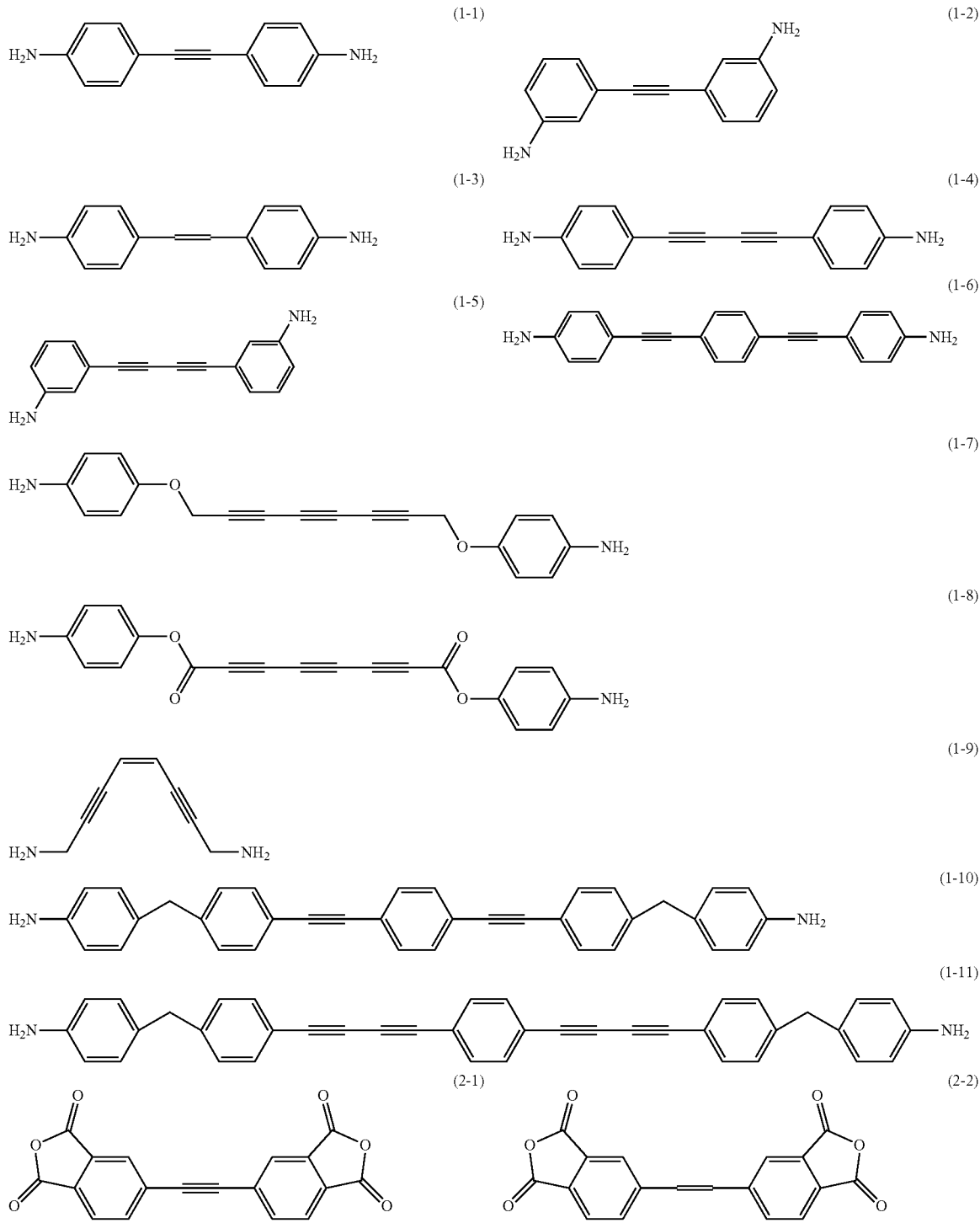

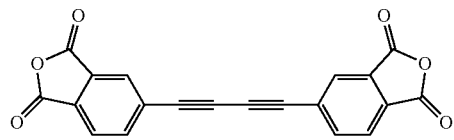 (2-3)
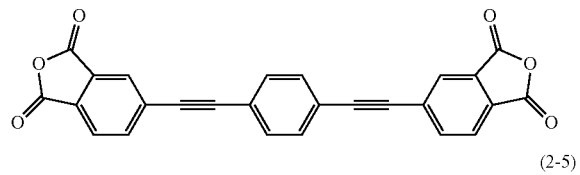 (2-4)
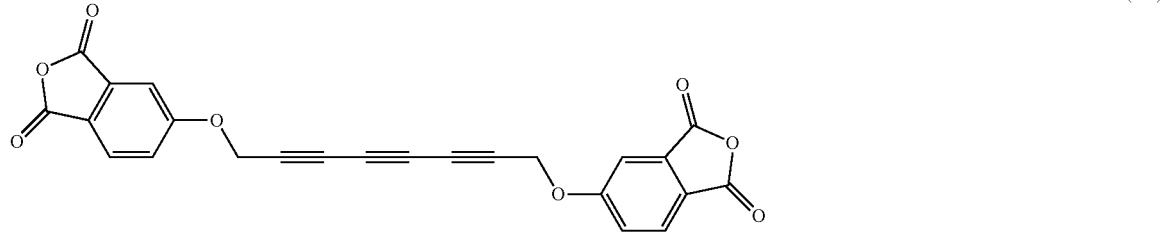 (2-5)
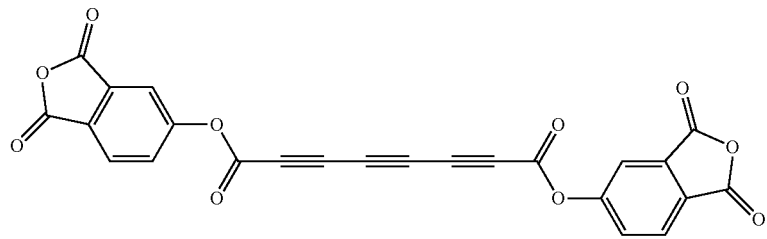 (2-6)
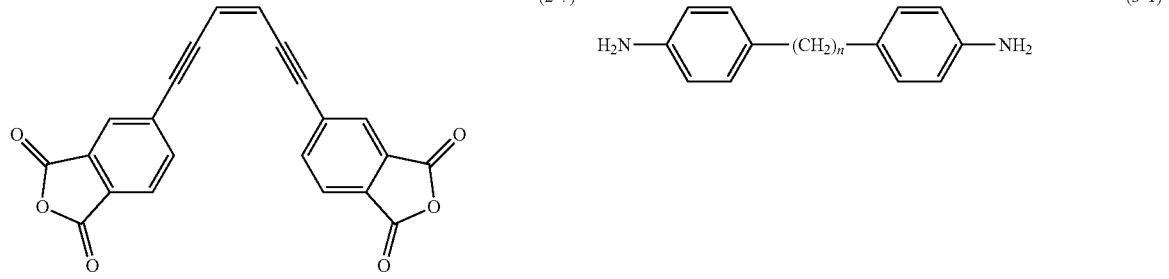 (2-7)
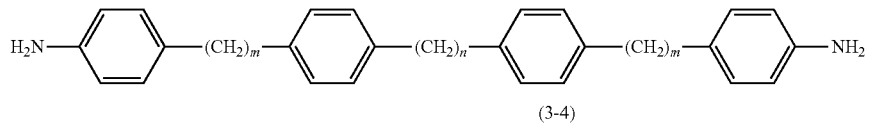 (3-1)
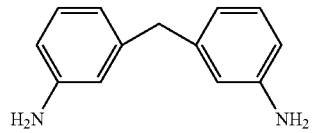 (3-2)
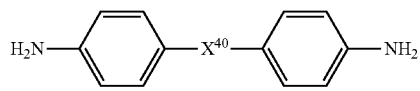 (3-3)
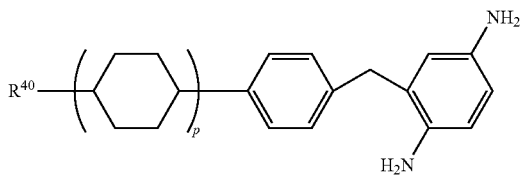 (3-4)
(3-5)
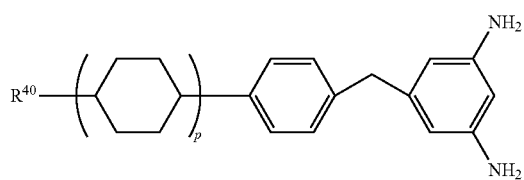 (3-6)

(3-7)

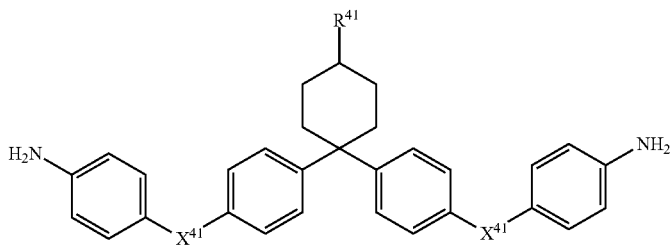

$X^{40}$ in the general formula (3-4) represents —O— or —S—, $X^{41}$'s in the general formula (3-7) each independently represent —CH$_2$—, —CH$_2$CH$_2$—, or —O—, $R^{40}$ in the general formulae (3-5) and (3-6) represents a hydrogen atom or an alkyl having 1 to 20 carbon atoms, $R^{41}$ in the general formula (3-7) represents a hydrogen atom or an alkyl group having 1 to 10 carbon atoms, n in the general formulae (3-1) and (3-3) represents an integral number of 1 to 6, m's in the general formula (3-3) each independently represent 1 or 2, and p in the general formulae (3-5) and (3-6) represents an integral number of 0 to 2.

(4-1)

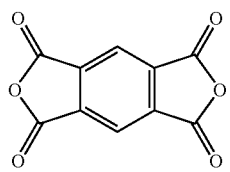

(4-2)

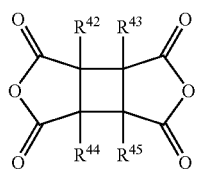

(4-3)

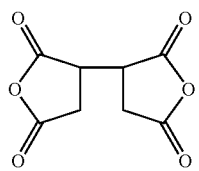

(4-4)

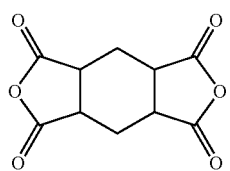

(4-5)

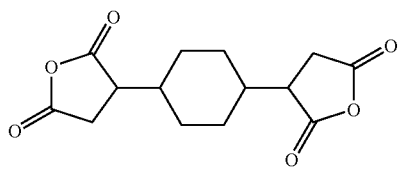

(4-6)

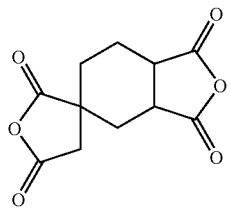

(4-7)

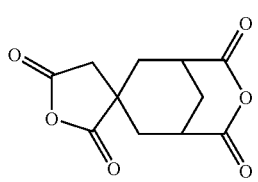

In the general formula (4-2), $R^{42}$, $R^{43}$, $R^{44}$, and $R^{45}$ each independently represent a hydrogen atom or a methyl group.

[12] The photo-alignment film according to the above item [11], wherein: the diamine and the tetracarboxylic acid dianhydride comprise one or both of one or two or more diamines selected from the group consisting of the structural formulae (1-1) to (1-6), (1-10) and (1-11) as component A of the diamine as the diamine and one or two or more tetracarboxylic acid dianhydrides selected from the group consisting of the structural formulae (2-1) to (2-3) as the component A of the tetracarboxylic acid dianhydride as the tetracarboxylic acid dianhydride; and the diamine and the tetracarboxylic acid dianhydride further comprise one or both of one or two or more diamines selected from the group consisting of the general formulae (3-1) and (3-3) to (3-7) and the structural formula (3-2) as component B of the diamine as the diamine and one or two or more tetracarboxylic acid dianhydrides selected from the group consisting of the general formula (4-2) and the structural formulae (4-1) and (4-3) as the component B of the tetracarboxylic acid dianhydride as the tetracarboxylic acid dianhydride.

[13] The photo-alignment film according to the above item [11] or [12], wherein the diamines represented by the general formulae (3-1) and (3-3) to (3-7) are diamines in which $X^{40}$ represents —O—, $X^{41}$'s each independently represent —CH$_2$— or —O—, $R^{40}$ represent a hydrogen atom or an alkyl group having 1 to 20 carbon atoms, $R^{41}$ represents an alkyl group having 1 to 10 carbon atoms, n represents an integral number of 1 to 4, m represents 1, and p represents an integral number of 0 to 2.

[14] The photo-alignment film according to the above item [1] or [11], wherein the photo-alignment film is a liquid crystal alignment film in which a polyimide main chain has an alignment index Δ determined form the following equation α of 0.5 or more:

$$\Delta = (|A_\parallel - A^\perp|)/\{(A_\parallel + A^\perp) \times d\}$$ (α)

In the equation (α), A∥ represents an integrated absorbance of an imide ring at a wave number of about 1,360 cm$^{-1}$ due to a C—N—C stretching vibration when linearly-polarized infrared light is applied perpendicular to the surface of the photo-alignment film so that a polarization direction of the infrared light is in parallel to an average alignment direction of the polyimide main chain, A$^{⊥}$ represents an integrated absorbance of the imide ring at a wave number of about 1,360 cm$^{-1}$ due to the C—N—C stretching vibration when the linearly-polarized infrared light is applied perpendicular to the surface of the photo-alignment film so that the polarization direction of the infrared light is in perpendicular to the average alignment direction of the polyimide main chain, and d represents a film thickness (nm) of the liquid crystal alignment film.

[15] A liquid crystal display element having: a pair of oppositely-arranged substrates; electrodes formed on one or both of oppositely-facing surfaces of the pair of the substrates; a liquid crystal film formed on each of the oppositely-facing surfaces of the pair of electrodes; and a liquid crystal layer formed between the pair of the substrates, wherein the liquid crystal alignment film is the photo-alignment film according to any one of the above items [1] to [14].

[16] A diamine represented by the following general formula (1):

$$H_2N\text{-}A^1\text{-}T\text{-}A^2\text{-}NH_2 \quad (1)$$

In the general formula (1), A$^1$ and A$^2$ each independently represent an aromatic ring having 6 to 30 carbon atoms, an alicyclic group having 3 to 10 carbon atoms, or an alkylene group having 1 to 10 carbon atoms, each of which may contain an oxy group and a carbonyl group, and T represents any one selected from the group consisting of the following formulae (D) to (G) provided that A$^1$ and A$^2$ are not 1,4- or 1,3-phenylene rings at once when T is (D).

(D)

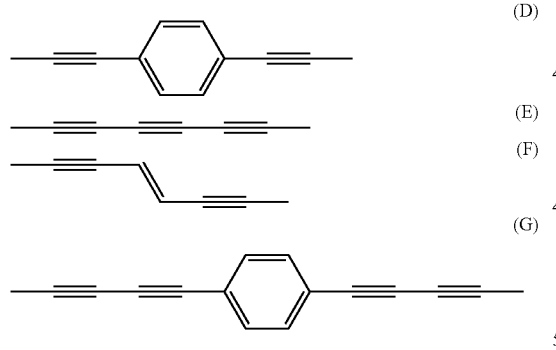
(E)

(F)

(G)

[17] The diamine according to the above item [16], which is represented by the following structural formula (1-10) or (1-11).

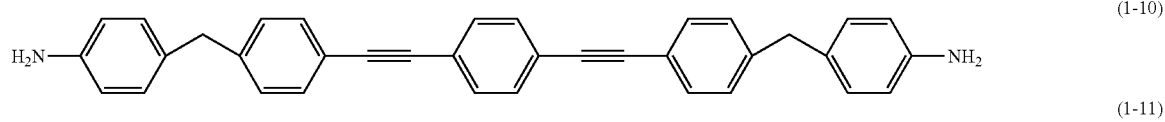
(1-10)

(1-11)

[18] A tetracarboxylic acid dianhydride represented by the following general formula (2).

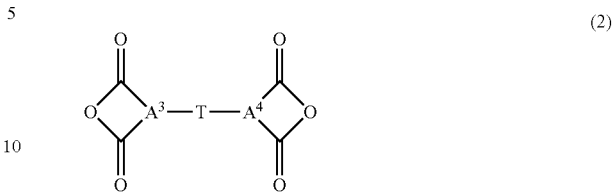
(2)

In the general formula (2), A$^3$ and A$^4$ each independently represent an aromatic ring having 6 to 20 carbon atoms or an aliphatic group having 1 to 20 carbon atoms, each of which may contain an oxy group and a carbonyl group, and T represents any one selected from the group consisting of the following formulae (D) to (G).

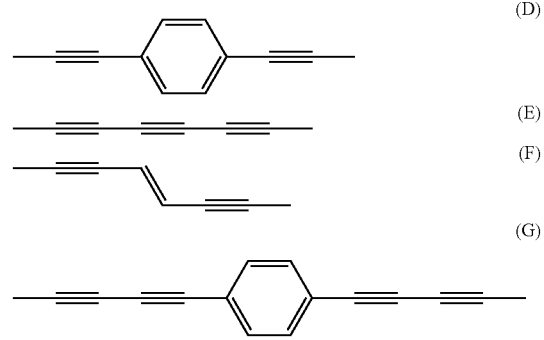
(D)

(E)

(F)

(G)

[19] The tetracarboxylic acid dianhydride according to the above item [18], which is represented by the following structural formula (2-7).

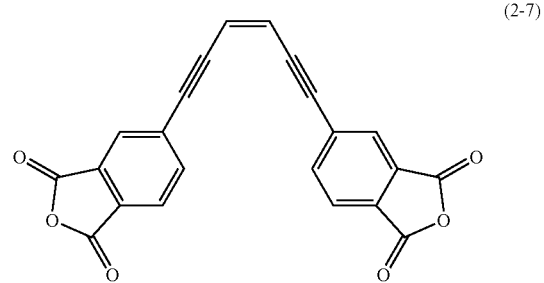
(2-7)

Effects of the Invention

A polyamic acid film, in which at least one of tetracarboxylic acid dianhydride and diamine as component A of raw materials of the polyamic acid is a compound having the group containing an unsaturated group, is subjected to light irradiation prior to imidization. Subsequently, the imidization is carried out to provide a photo-alignment film, thereby resulting in a photo-alignment film having an excellent alignment stability of a liquid crystal composition thereof, a high voltage holding ratio, and a low ion density. When the photo-alignment film thus prepared is used in the manufacture of a display, a uniform alignment can be obtained even in the case of a large-sized screen display or a high-resolution display. In addition, the electric properties of the photo-alignment film can be prevented from decreasing due to contamination caused in a contact-type alignment treatment, such as a rubbing treatment.

Mode for Carrying out the Invention

The photo-alignment film of the present invention is a photo-alignment film prepared by applying a polyamic acid solution on a substrate, removing a solvent to form a film, and aligning the polyamic acid in the film in a predetermined direction by light irradiation, and imidizing the polyamic acid. The polyamic acid is a reaction product obtained using raw materials, where the raw materials used are a tetracarbocylic acid dianhydride consisting of two acid anhydride groups and their binding groups and a diamine consisting of two amino groups and their binding groups. As component A in the raw materials of the polyamic acid, at least any of the binding groups of the acid dianhydride and the binding groups of the amino group includes a divalent group containing an unsaturated bond having 1 to 4 carbon-carbon double bonds or triple bonds.

The carbon-carbon double bonds or triple bonds in the group containing an unsaturated bond may be preferably conjugated together as many as possible for obtaining higher alignment properties thereof with smaller amount of light. However, the conjugations in large number may lead to poor stabilities to heat and light. In addition, large absorption occurs at visible wavelengths, so that an increase in color development may occur when a photo-alignment film is prepared. Therefore, the number of double bonds is preferably 1 to 2 and the number of triple bonds is preferably 1 to 3. More preferably, the number of double bonds is 1(one) and the number of triple bonds is 2 to 3.

When T contains a double bond, there are two isomers of cis or trans. However, the photo-alignment film of the present invention may use any of these isomers.

When the tetracarboxylic acid dianhydride contains the divalent group containing an unsaturated bond, another diamine without the divalent group containing an unsaturated bond can be used as B component of an amine as a raw material of the polyamic acid.

The diamine containing an unsaturated bond including the carbon-carbon double bond or triple bond includes a diamine represented by the general formula (1). The diamine containing an unsaturated bond may be one or two or more diamines represented by the general formula (1).

$$H_2N\text{-}A^1\text{-}T\text{-}A^2\text{-}NH_2 \quad (1)$$

In the general formula (1), $A^1$ and $A^2$ independently represent an aromatic ring having 6 to 20 carbon atoms, an alicyclic group having 3 to 10 carbon atoms, or an alkylene having 1 to 10 carbon atoms. Each of $A^1$ and $A^2$ may contain oxy and carbonyl. Each of $A^1$ and $A^2$ may be selected from a known aromatic ring group, alicyclic group, and alkyl. However, from the viewpoint of providing a photo-alignment film with facility in production and good characteristics and also providing the photo-alignment film with a high VHR, as $A^1$ and $A^2$, groups represented by the following (I) to (VII) are preferable, groups represented by (I) to (V) and (VII) are more preferably. By the way, in formula (VI) or (VII), n represents an integer number of 1 to 10.

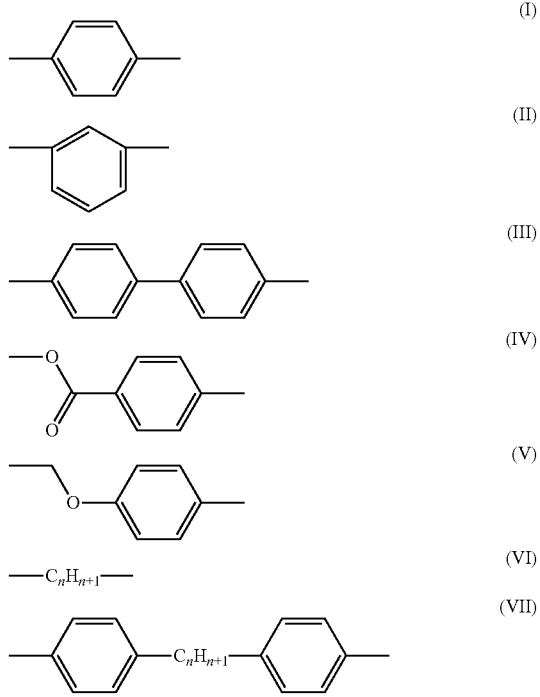

The polyamic acid in which $A^1$ and $A^2$ are aromatic groups represented by the above (I) to (III) shows a good alignment property but an increase in color development. In addition, The polyamic acid in which $A^1$ and $A^2$ are represented by the above (IV) to (VII) shows a decrease in color development but a slightly decrease in alignment property. The alignment property of the polyamic acid when the (IV) to (VII) are employed as $A^1$ or $A^2$ can be improved by introducing a structural unit made of the aromatic ring into the main chain of the polyamic acid in conjunction with the above another diamine containing an aromatic ring such as the above (I) to (III) as the diamine containing an unsaturated bond.

In addition, in the general formula (I), a group containing an unsaturated bond represented by T is a divalent group containing an unsaturated bond which has 1 to 3 carbon-carbon double bonds or 1 to 4 triple bonds. The group containing an unsaturated bond is preferably a group represented by (A) to (G), which shows good photo-alignment property and can be easily produced. For showing higher photo-alignment property, the groups represented by formula (C) to (G) are more preferable.

-continued

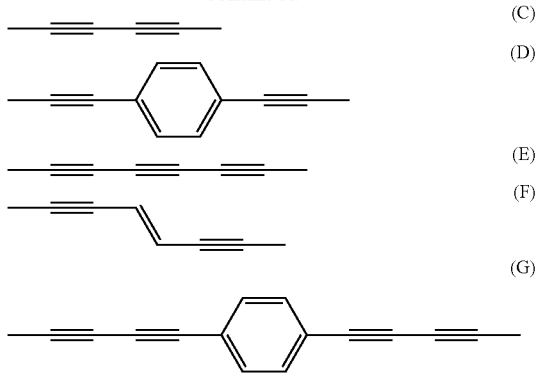

(C)
(D)
(E)
(F)
(G)

The diamine of the general formula (1) in which T is represented by any of the above (D) to (G) can be synthesized following Scheme 1.

Scheme 1

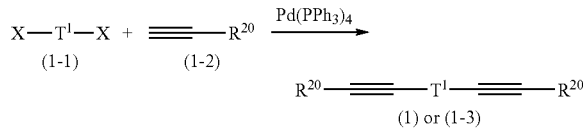

$T^1$ in the formula represents 1,4-phenylene, a carbon-carbon double bond, a triple bond, or the above (D), X represents a group having one of chlorine, bromine, or iodine, and $R^{20}$ represents a group having an amino or a nitro.

More specifically, according to any method described in documents, such as Lambert Brandsma, Preparative Acetylenic Chemistry, 2nd Ed., 1988, ELSEVIER, or European Journal Organic Chemistry, 3879 (2001), the diamine represented by (1) or a dinitro compound represented by (1-3) in the above Scheme 1 can be prepared such that a dihalogen compound represented by (1-1) in Scheme 1 is reacted with an acetylene compound represented by (1-2) in Scheme 1 in the presence of a paradium catalyst and optionally a prompter. The dinitro compound is reduced using tin chloride, and the like, in a manner similar to a method, such as one described in Organic Synthesis, Collective Volume, 2, 130 (1943), thereby obtaining the objective diamine represented by the general formula (1).

Here, the compound represented by (1-1) in Scheme 1 may be commercially-available cis-1,2-dichloroethylene or trans-1,2-dichloroethylene, dibromo acetylene or diiodine acetylene as described in J. Am. Chem. Soc., 91, 5673 (1069) or Tetrahedron, 27, 33, (1971), or 1,4-diiodine ethynyl benzene as described in Tetrahedron Lett., 40, 8579, (1999). In addition, the compound represented by (1-2) in Scheme 1 may be commercially available 3-ethynyl aniline or 4-ethynyl aniline, 4-(2-propine oxy) aniline as described in J. Org. Chem. Soc., 37, 841 (1972), or 4-nitrophenol propiolic acid ester as described in J. Org. Chem. Soc., 39, 725 (1974), and the like.

The catalysts, which can be used in the reaction of Scheme 1, preferably include a zero-valent paradium catalyst such as tetrakis (triphenyl phosphine) paradium (0) and a divalent paradium catalyst such as dichloro-bis-triphenyl phosphine paradium (2). In addition, the prompter preferably include monovalent copper salts such as copper iodide and copper chloride. In addition, the solvents preferably include an amine-based solvent such as diethyl amine, triethyl amine, pyrrolidine, or piperidine, or a mixture of such an amine-based solvent with another solvent of tetrahydrofuran, ethylene glycol methyl ether, or the like. Further, the reaction temperature can be selected from 0° C. to the boiling points of the respective solvents. The range of room temperature to 100° C. is preferable.

The compounds represented by the general formula (1) and the intermediates thereof can be purified by column chromatography or recrystallization. Identification thereof can be performed by using any of spectrographic procedures, such as $^1$H NMR, $^{13}$C NMR, or IR, or mass spectrum.

For diamine residues represented by $A^1$-T-$A^2$ in the diamine represented by the general formula (1), preferable examples of diamine in the photo-alignment film of the present invention, which will be described later, include (20) to (55) as described below.

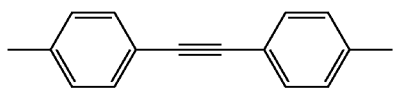
(20)

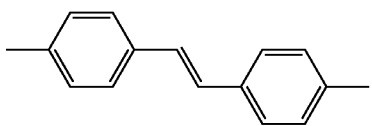
(21)

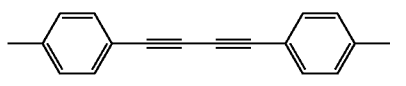
(22)

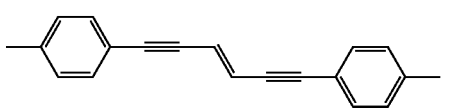
(23)

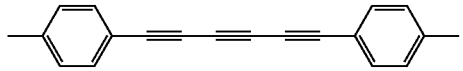
(24)

(25)

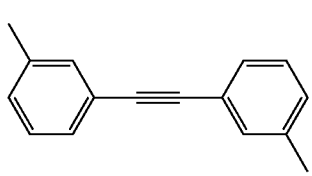
(26)

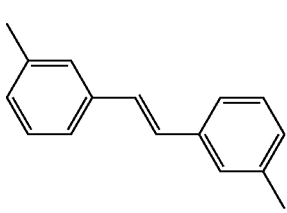
(27)

-continued
(28)
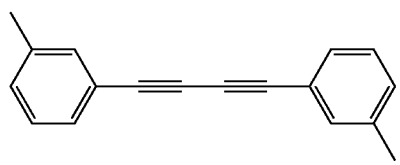
(29)
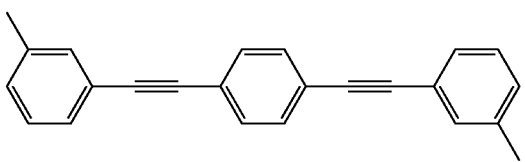
(30)
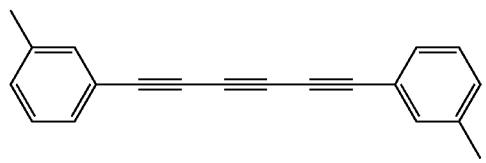
(31)
(33)
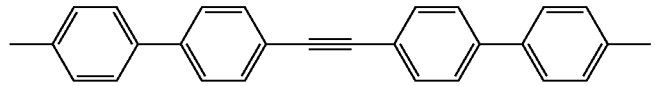
(34)
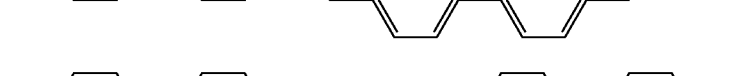
(35)
(36)
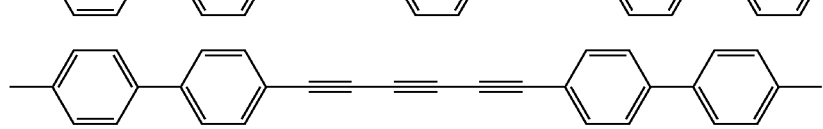
(37)
(38)
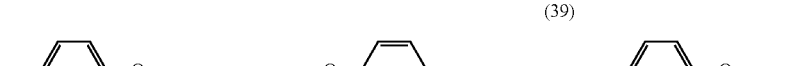
(39)
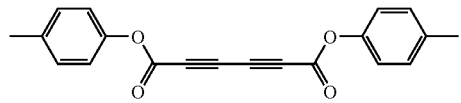
(40)
(41)
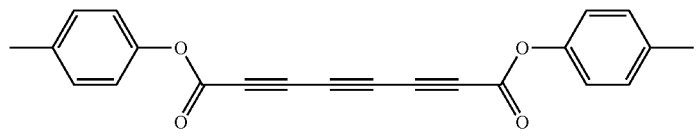
(42)
(43)
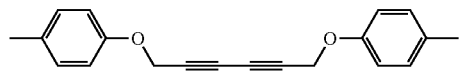
(44)
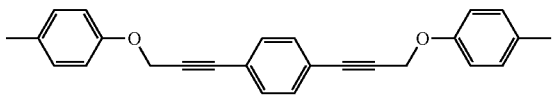

-continued

 (45)

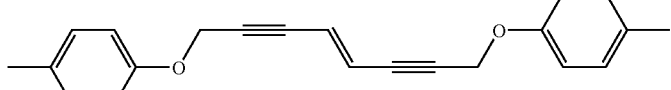 (46)

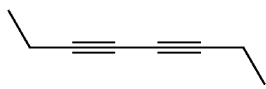 (47)

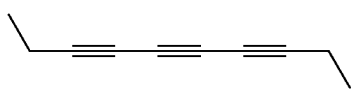 (49)

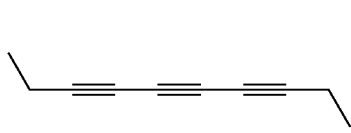 (49)

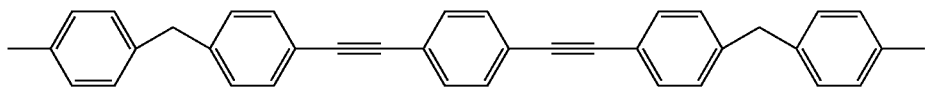 (48)

(50)

(50)

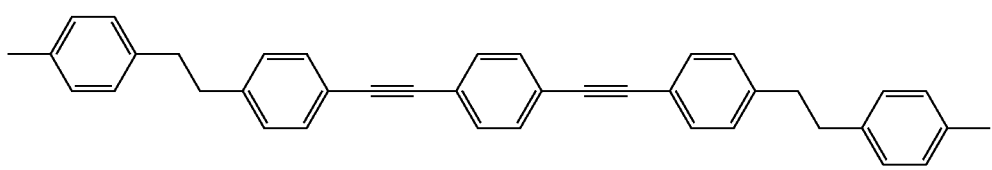 (51)

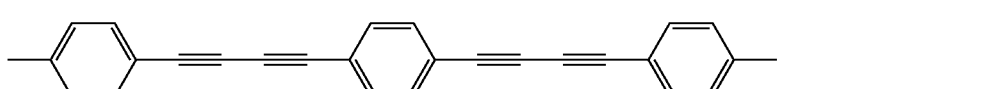 (52)

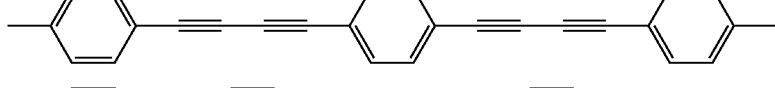 (53)

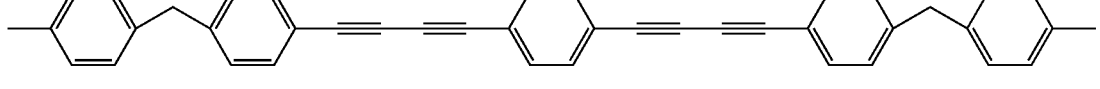 (54)

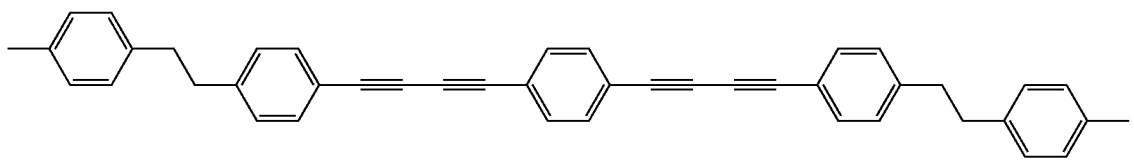 (55)

Any other diamine that does not contain the groups containing an unsaturated bond can be suitably selected as an optional component, component B, depending on the use of a photo-alignment film. The other diamine may be one or two or more diamines other than those having the groups containing an unsaturated bond. For instance, when the photo-alignment film is employed as a liquid crystal alignment film, the other diamine used may be any diamine which has been known in the art as a raw material of polyamic acid for the liquid crystal alignment film. More specifically, when a liquid crystal alignment film for IPS is manufactured, a diamine having a comparatively small molecular weight may be used for reducing a pre-tilt angle of a liquid crystal composition. In addition, when a liquid crystal requires a larger pre-tilt angle for a liquid crystal alignment film for TN, VA, or OCB, a diamine having a larger molecular weight may be used.

These diamines known in the art can preferably include, but not specifically limited to, compounds listed in Tables 1 to 4 below.

TABLE 1

| Preferable diamines known in the art | |
|---|---|
| No. | Diamine |
| 1-1 | $H_2N(CH_2)_3NH_2$ |
| 1-2 | $H_2N(CH_2)_4NH_2$ |
| 1-3 | $H_2N(CH_2)_6NH_2$ |
| 1-4 | $H_2N(CH_2)_{12}NH_2$ |

TABLE 1-continued

Preferable diamines known in the art

| No. | Diamine |
|---|---|
| 1-5 | H₂N–(cyclohexane)–NH₂ |
| 1-6 | H₂N–(cyclohexane)–CH₂–(cyclohexane)–NH₂ |
| 1-7 | bicyclic structure with H₂N–CH₂ and CH₂–NH₂ substituents |
| 1-8 | H₂N–(methylcyclohexane)–CH₂–(methylcyclohexane)–NH₂ |
| 1-9 | H₂N–(1,4-phenylene)–NH₂ |
| 1-10 | H₂N–(1,3-phenylene)–NH₂ |
| 1-11 | H₂N–(phenyl with C₄H₉ substituent)–NH₂ |
| 1-12 | H₂N–(phenyl with OC₁₂H₂₅ substituent)–NH₂ |
| 1-13 | H₂N–CH₂–(1,3-phenylene)–CH₂–NH₂ |
| 1-14 | H₂N–(4-phenyl)–O–(4-phenyl)–NH₂ |
| 1-15 | H₂N–(4-phenyl)–CH₂–(4-phenyl)–NH₂ |
| 1-16 | H₂N–(3-phenyl)–CH₂–(3-phenyl)–NH₂ |
| 1-17 | H₂N–(methyl-substituted phenyl)–CH₂–(methyl-substituted phenyl)–NH₂ |
| 1-18 | H₂N–(methyl-substituted phenyl)–CH₂–(methyl-substituted phenyl)–NH₂ |
| 1-19 | H₂N–(dimethyl-substituted phenyl)–CH₂–(dimethyl-substituted phenyl)–NH₂ |
| 1-20 | H₂N–(4-phenyl)–CH₂CH₂–(4-phenyl)–NH₂ |

TABLE 2

Preferable diamines known in the art

| No. | Diamine |
|---|---|
| 1-21 | H₂N–(methyl-substituted phenyl)–CH₂CH₂–(methyl-substituted phenyl)–NH₂ |
| 1-22 | H₂N–(methyl-substituted phenyl)–CH₂CH₂–(methyl-substituted phenyl)–NH₂ |

TABLE 2-continued
Preferable diamines known in the art
| No. | Diamine |
|---|---|
| 1-23 | 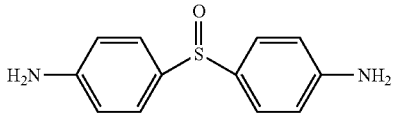 |
| 1-24 | 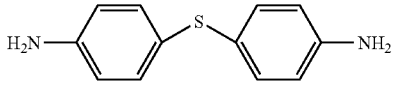 |
| 1-25 | 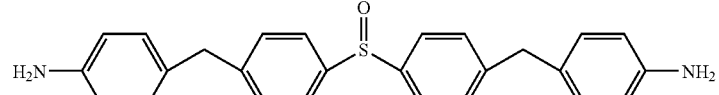 |
| 1-26 |  |
| 1-27 | 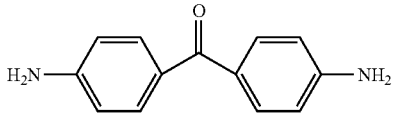 |
| 1-28 |  |
| 1-29 | 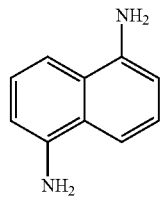 |
| 1-30 | 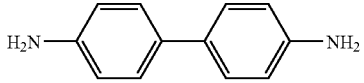 |
| 1-31 | 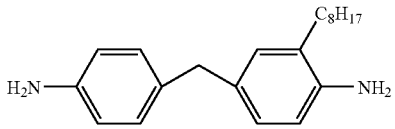 |
| 1-32 | 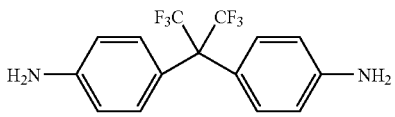 |
| 1-33 | 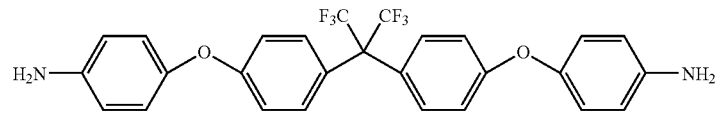 |
| 1-34 | 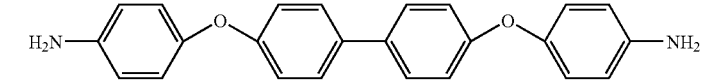 |

TABLE 3

Preferable diamines known in the art

| No. | Diamine |
|---|---|
| 1-35 | ![structure] |
| 1-36 | ![structure] |
| 1-37 | ![structure] |
| 1-38 | ![structure] |
| 1-39 | ![structure] |
| 1-40 | ![structure] |
| 1-41 | ![structure] |
| 1-42 | ![structure] |

TABLE 3-continued

Preferable diamines known in the art

| No. | Diamine |
|---|---|
| 1-43 | 2-benzyl-1,4-phenylenediamine (Bn at position 2, H₂N at 1 and 4) |
| 1-44 | 5-benzyl-1,3-phenylenediamine |
| 1-45 | 3,5-diamino-benzyl-(4-cyclohexylphenyl) compound |
| 1-46 | 3,5-diamino-benzyl-[4-(4-pentylcyclohexyl)phenyl] compound |

TABLE 4

Preferable diamines known in the art

| No. | Diamine |
|---|---|
| 1-47 | 2-{[4-(4-pentylcyclohexyl)phenyl]methyl}-1,4-phenylenediamine |
| 1-48 | 3,5-diamino-benzyl-[4-(4'-propyl-[1,1'-bicyclohexyl]-4-yl)phenyl] compound |
| 1-49 | 2-{[4-(4'-propyl-[1,1'-bicyclohexyl]-4-yl)phenyl]methyl}-1,4-phenylenediamine |

TABLE 4-continued

Preferable diamines known in the art

| No. | Diamine |
|---|---|
| 1-50 |  |
| 1-51 | |
| 1-52 | |

Further, the preferably other diamine includes those represented by the following general formula (3).

$$H_2N-R^1-NH_2 \qquad (3)$$

In the general formula (3), $R^1$ represents a divalent organic group selected from groups represented by the following general formulae (5) to (8).

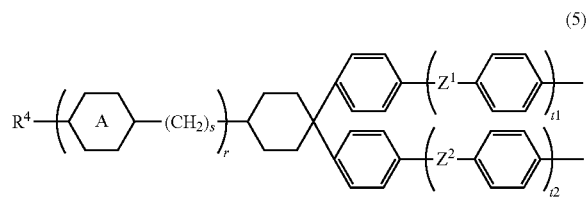

(5)

In the general formula (5), $R^4$ represents H or an alkyl group having 1 to 12 carbon atoms, rings A each independently represent 1,4-phenylene or 1,4-cyclohexylene, $Z^1$ and $Z^2$ each independently represent a single bond, $CH_2$, $CH_2CH_2$, or O, r represents an integral number of 0 to 3, S's each independently represent an integral number of 0 to 5, t1 represents an integral number of 0 to 3, and t2 represents an integral number of 0 to 3. In addition, any H of 1,4-phenylene or 1,4-cyclohexylene may be substituted with an alkyl group having 1 to 4 carbon atoms. The other diamine containing the general formula (5) includes 1-35 to 1-38, 1-40, and 1-41 in Table 3 above.

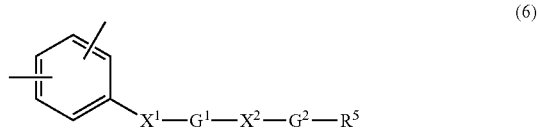

(6)

In the general formula (6), $X^1$ and $X^2$ each represent a single bond, O, COO, OCO, NH, CONH, or an alkylene group having 1 to 12 carbon atoms, $G^1$ and $G^2$ each represent a single bond or a divalent group containing 1 to 3 rings selected from an aromatic ring and alicyclic ring, and $R^5$ represents H, F, CN, OH, or alkyl group, perfluoroalkyl, or alkoxyl group having 1 to 30 carbon atoms. A binding position of a substituent and positions of two free radicals to a benzene ring are arbitrary positions provided that, when $G^2$ is a single bond and $X^2$ is neither a single bond nor the alkylene group, $R^5$ is H or the alkyl group and when both $G^1$ and $G^2$ are single bonds, the total carbon atoms of $X^1$, $X^2$, and $R^5$ is 3 or more. The other diamine containing the general formula (6) includes 1-9 to 1-12, 1-43 to 1-52 in Tables 1, 3, and 4 above.

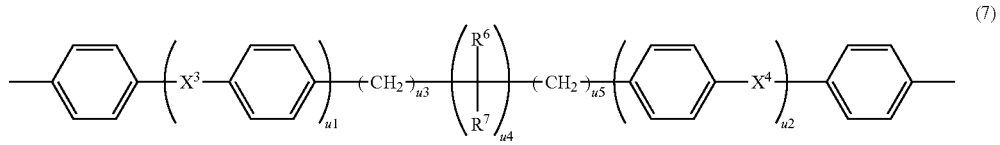

(7)

In the general formula (7), $X^3$ and $X^4$ each independently represent a single bond, $CH_2$, $CH_2CH_2$, or O, $R^6$ and $R^7$ each independently represent H, an alkyl group having 1 to 12 carbon atoms, or a perfluoroalkyl group having 1 to 12 carbon atoms. u1, u2, u3, u4, and u5 each independently represent an integral number of 0 to 3. In addition, any H of 1,4-phenylene may be substituted with an alkyl group having 1 to 4 carbon atoms. The other diamine containing the general formula (7) includes 1-15 to 1-19, 1-26, 1-28, and 1-33 in Tables 1 and 2 above.

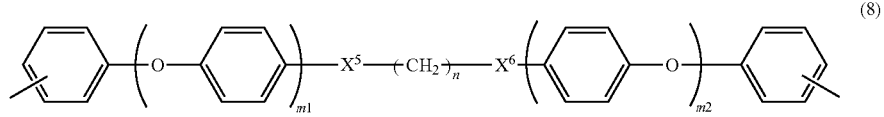

In the general formula (8), $X^5$ and $X^6$ each independently represent a single bond, O, or S, m1 and m2 each independently represent an integral number of 0 or 1, and n represents an integral number of 0 to 10. In addition, binding positions of a substituent and two free radicals to a benzene ring are arbitrary positions. The other diamine containing the general formula (8) includes 1-14, 1-24, and 1-42 in Tables 1 to 3 above.

When a liquid crystal display element including the photo-alignment film of the present invention is manufactured, heat- or light-curing polymers can be used for laminating a substrate and clogging an inlet for a liquid crystal composition. When those sealing agent and sealant are used, impurities may be eluted out and attached to the photo-alignment film, thereby deteriorating the characteristics of the liquid crystal display element. For preventing such a trouble, a siloxane-based diamine represented by a general formula (20) described below can be used as the other diamine.

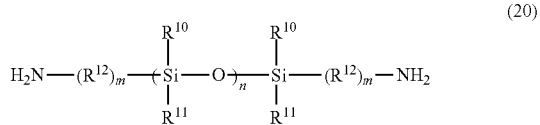

In the general formula (20), $R^{10}$ and $R^{11}$ each independently represent an alkyl having 1 to 3 carbon atoms or phenyl group. $R^{10}$ and $R^{11}$ may be the same group or may be different groups. In addition, $R^{12}$'s each independently represent a methylene, phenylene, or alkyl-substituted phenylene group. m's each independently represent an integral number of 1 to 6. n represents an integral number of 1 to 10. The other diamine each represented by the general formula (20) includes the following compounds or polymers.

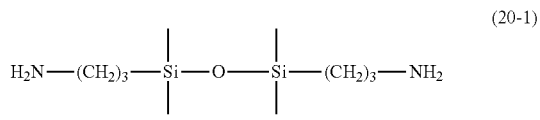

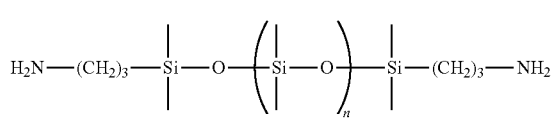

In the formula (20-2), the polymer has a molecular weight of 850 to 3,000.

The amounts of those siloxane-based diamines added are preferably 0.5 mol % to 30 mol %, more preferably 1 mol % to 10 mol % with respect to the whole material components of polyamic acid for exerting the effects as described above and preventing the other characteristics from deteriorating.

In the tetracarboxylic acid dianhydride, a tetracarboxylic acid dianhydride containing an unsaturated bond, which has the group containing an unsaturated group as described above, can be used as component A of an acid provided as a raw material of the polyamic acid. When the diamine contains the group containing an unsaturated group, any other tetracarboxylic acid dianhydride having no group containing an unsaturated group as described above can be used as component B of an acid as a raw material of the polyamic acid in the tetracarboxylic acid dianhydride.

The tetracarboxylic acid dianhydride having an unsaturated bond includes tetracarboxylic acid dianhydride represented by the general formula (2). The tetracarboxylic acid dianhydride containing an unsaturated bond may be one or two or more tetracarboxylic acid dianhydrides each represented by the general formula (2).

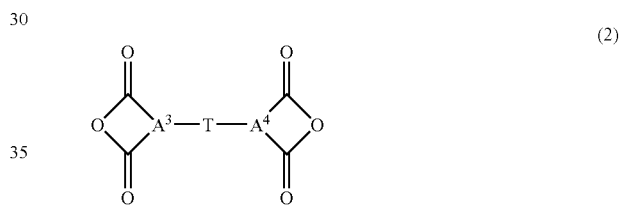

In the general formula (2), $A^3$ and $A^4$ each independently represent an aromatic ring having 6 to 20 carbon atoms or an aliphatic group having 1 to 20 carbon atoms. $A^3$ and $A^4$ may include oxy and carbonyl group respectively. Specific examples of those $A^3$ and $A^4$ may be the same groups as those of $A^1$ and $A^2$ in the diamine containing an unsaturated bond as described above. In addition, T is a group containing an unsaturated group having 1 to 3 carbon-carbon double bonds or 1 to 4 triple bonds as in the case with the diamine containing an unsaturated bond as described above, and is preferably any one selected from the groups of (A) to (G) described below.

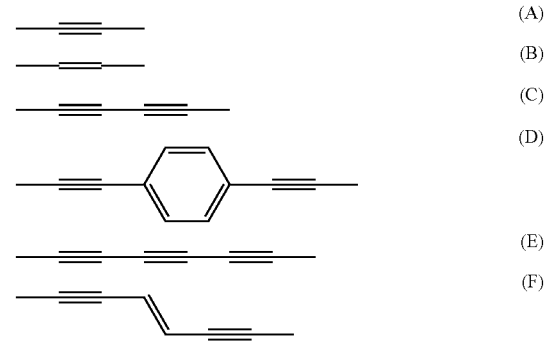

-continued (G)
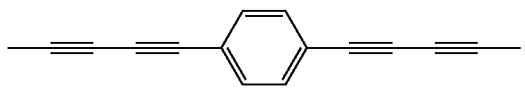

A³ and A⁴ may be selected from known aromatic groups, alicyclic groups, and alkyl groups, but the following formulae (VIII) to (X) are preferable from the standpoint of an easiness of manufacture, good characteristics when the photo-alignment film is formed into a photo-alignment film, and providing the photo-alignment film with high VHR. A polyamic acid in which A³ and A⁴ are aromatic groups represented by the formulae (VIII) to (X) slightly losses its reactivity to light, so that it is effective to select any group in which double bonds or triple bonds have conjugative, such as any one of the above groups (C) to (G), as T.

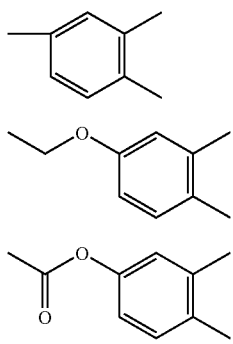

A³ and A⁴ are further preferably groups each represented by the formula (VIII) from the standpoint of providing the photo-alignment film with high VHR.

The tetracarboxylic acid dianhydride of the general formula (2) in which T is represented by any one of the above groups (D) to (G) can be synthesized in accordance with Scheme 2 below.

Scheme 2

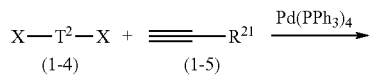

-continued
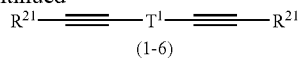
(1-6)

In the formula, T² represents 1,4-phenylene, a carbon-carbon double bond, a carbon-carbon triple bond, or the above group (D), X represents chlorine, bromine, or iodine, and R²¹ represents a group having two residues of a carboxylic acid or of a carboxylate.

In other words, as in the case with the above method, according to a method described in a document, such as Lambert Brandsma, Preparative Acetylenic Chemistry, 2nd Ed., 1988, ELSEVIER or European Journal Organic Chemistry, 3879 (2001), a dihalide represented by (1-4) in Scheme 2 is reacted with an acetylene compound represented by (1-5) in Scheme 2 in the presence of a palladium catalyst and a promoter to be optionally added, thereby preparing a compound having a tetracarboxylic acid or tetracarboxylate represented by (1-6) in Scheme 2. The tetracarboxylate represented by (1-6) in Scheme 2 is hydrolyzed by heating with hydrochloric acid, an aqueous sodium hydroxide solution, or the like, so that it can be introduced to a tetracarboxylic acid. The tetracarboxylic acid can be introduced to the above objective general formula (2) by treating with a dehydrating agent such as acetic acid anhydride.

A Compound represented by (1-4) in Scheme 2, which can be used herein, is commercially-available 1,4-dibromobenzene, 1,4-diiodobenzene, the above cis-1,2-dichloroethylene, trans-1,2-dichloroethylene, dibromoacetylene, diiodoacetylene, or 1,4-diiodoethynyl benzene. In addition, the compounds represented by (1-5) in Scheme 2, which can be used herein, include 4-ethynyl phthalic acid and diethyl ester as described in JP 04-013650 A, and 4-propynyl oxyphthalic acid as described in DE 3430174 A.

The compounds represented by the general formula (2) and the intermediates thereof can be purified by column chromatography or recrystallization. They can be identified using any one of spectrographic procedures, such as 1H NMR, ¹³C NMR, and IR, or mass spectrum.

Synthesis of those compounds will be described in examples below.

Further, acid dianhydride residues each represented by A³-T-A⁴, which are suitable acid dianhydrides for the photo-alignment film of the present invention as described below, include the following residues (56) to (70).

(56)
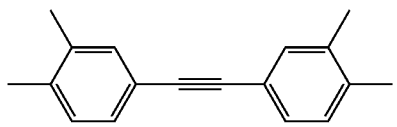

(57)
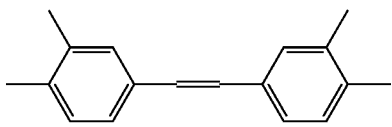

(58)
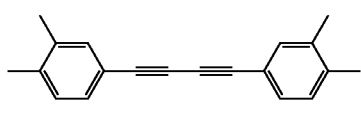

(59)
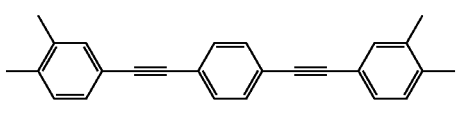

(60)
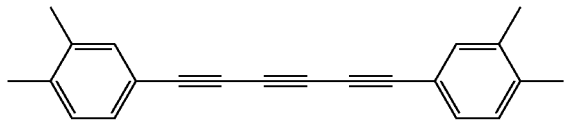

-continued

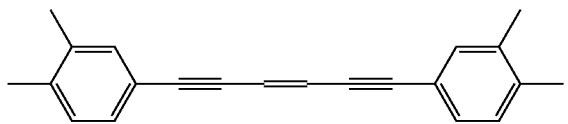
(61)

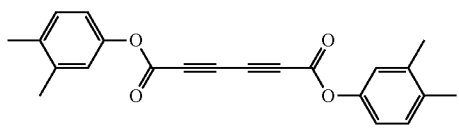
(62)

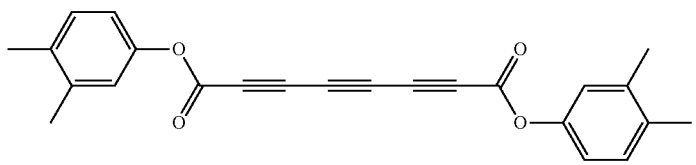
(63)

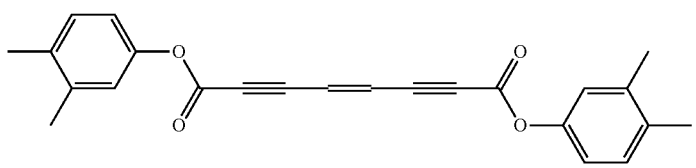
(64)

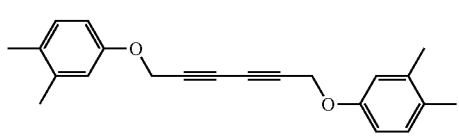
(65)

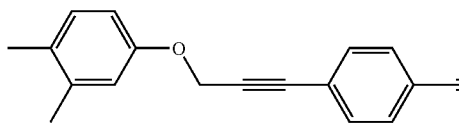
(66)

(67)

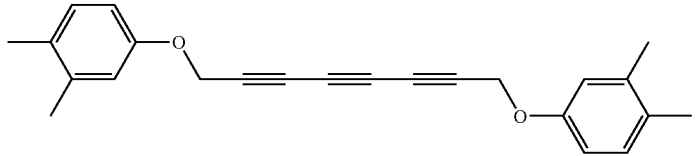
(68)

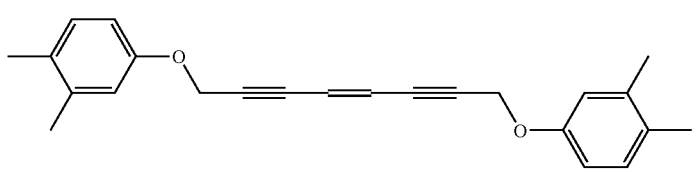
(69)

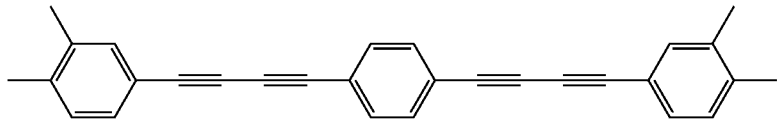
(70)

Other tetracarboxylic acid dianhydride, which does not have the group containing an unsaturated group as described above, can be appropriately selected depending on the intended use of a photo-alignment film as a given component, component B. The other tetracarboxylic acid dianhydride may be one or two or more of tetracarboxylic acid dianhydrides except the above tetracarboxylic acid dianhydride containing an unsaturated bond. For example, when the photo-alignment film is used as a liquid crystal alignment film, the other tetracarboxylic acid dianhydrid used can be a tetracarboxylic acid dianhydride conventionally known as a raw material of polyamic acid for a liquid crystal alignment film. More specifically, when the photo-alignment film demands larger photo-alignment property, an aromatic tetracarboxylic acid dianhydride may be used for extending an interaction with a liquid crystal composition. In addition, when the color development of polyamic acid is larger than expected, it can be alleviated by means of an aliphatic tetracarboxylic acid dianhydride. Further, when VHR is smaller than expected, it can be alleviated by means of a tetracarboxylic acid dianhydride having an alicyclic structure.

Those known tetracarboxylic acid dianhydrides include, but not specifically limited to, compunds listed in Tables 5 to 8 below.

TABLE 5

Suitable known tetracarboxylic acid dianhydrides

| No. | Tetracarboxylic acid Dianhydride |
|---|---|
| 2-1 | |
| 2-2 | |
| 2-3 | |
| 2-4 | |
| 2-5 | |
| 2-6 | |
| 2-7 | |

TABLE 5-continued

Suitable known tetracarboxylic acid dianhydrides

| No. | Tetracarboxylic acid Dianhydride |
|---|---|
| 2-8 | |
| 2-9 | |
| 2-10 | |

TABLE 6

Suitable known tetracarboxylic acid dianhydrides

| No. | Tetracarboxylic acid dianhydride |
|---|---|
| 2-11 | |
| 2-12 | |
| 2-13 | |
| 2-14 | |

TABLE 6-continued

Suitable known tetracarboxylic acid dianhydrides

| No. | Tetracarboxylic acid dianhydride |
|---|---|
| 2-15 | |
| 2-16 | |
| 2-17 | |
| 2-18 | |
| 2-19 | |
| 2-20 | |

TABLE 7

Suitable known tetracarboxylic acid dianhydrides

| No. | Tetracarboxylic acid dianhydride |
|---|---|
| 2-21 | |

TABLE 7-continued

Suitable known tetracarboxylic acid dianhydrides

| No. | Tetracarboxylic acid dianhydride |
|---|---|
| 2-22 | |
| 2-23 | |
| 2-24 | |
| 2-25 | |
| 2-26 | |
| 2-27 | |
| 2-28 | |
| 2-29 | |

TABLE 7-continued

Suitable known tetracarboxylic acid dianhydrides

| No. | Tetracarboxylic acid dianhydride |
|---|---|
| 2-30 | (structure) |

TABLE 8

Suitable known tetracarboxylic acid dianhydrides

| No. | Tetracarboxylic acid dianhydride |
|---|---|
| 2-31 | (structure) |
| 2-32 | (structure) |
| 2-33 | (structure) |
| 2-34 | (structure) |
| 2-35 | (structure) |
| 2-36 | (structure) |
| 2-37 | (structure) |
| 2-38 | (structure) |
| 2-39 | (structure) |

Some of those compounds may include isomers, so that mixtures of isomers are allowable. In addition, any combination of acid dianhydrides listed in the above tables may be used. Further, the tetracarboxylic acid dianhydrides used in the present invention may be compounds except those described above.

For the other tetracarboxylic acid dianhydride, preferable tetracarboxylic acid dianhydrides include a tetracarboxylic acid dianhydride each represented by the following general formula (4).

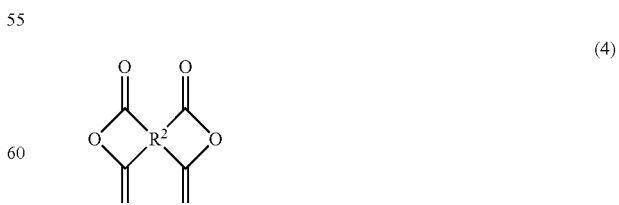

(4)

In the general formula (4), $R^2$ represents a tetravalent group selected from groups represented by the following general formulae (9) to (17).

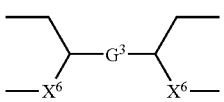
(9)

In the general formula (9), $G^3$ is a single bond, an alkylene group having 1 to 12 carbon atoms, 1, 4-phenylene, or 1,4-cyclohexylene, $X^6$'s each independently represent a single bond or —$CH_2$—. The other tetracarboxylic acid dianhydride containing the general formula (9) includes 2-26, 2-27, 2-29, and 2-33 in Tables 7 and 8 as described above.

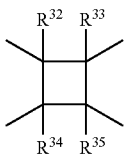
(10)

In the general formula (10), $R^{32}$, $R^{33}$, $R^{34}$, and $R^{35}$ each represent H, or a methyl, ethyl, or phenyl group. The other tetracarboxylic acid dianhydride containing the general formula (10) includes 2-2 and 2-38 in Tables 5 and 8 as described above.

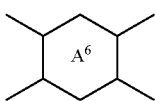
(11)

In the general formula (11), $A^6$ represents a cyclohexane ring or a benzene ring. The other tetracarboxylic acid dianhydride containing the general formula (11) includes 2-1 and 2-13 in Tables 5 and 6 as described above.

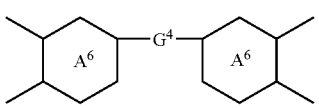
(12)

In the general formula (12), $G^4$ represents a single bond, —$CH_2$—, —$CH_2CH_2$—, —O—, —CO—, —S—, —$C(CH_3)_2$—, or —$C(CF_3)_2$—. $A^6$'s each independently represent a cyclohexane ring or a benzene ring. The other tetracarboxylic acid dianhydride containing the general formula (12) includes 2-3 to 2-7, 2-11, 2-14 to 2-16, 2-18, 2-19, and 2-32 in Tables 5, 6, and 8 as described above.

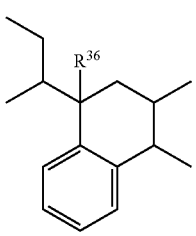
(13)

In the general formula (13), $R^{36}$ represents H or a methyl group. The other tetracarboxylic acid dianhydride containing the general formula (13) includes 2-20 in Table 6 as described above.

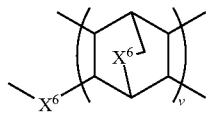
(14)

In the general formula (14), $X^6$'s each independently represent a single bond or —$CH_2$—. V represents 1 or 2. The other tetracarboxylic acid dianhydride containing the general formula (14) includes 2-22 to 2-24 in Table 7 as described above.

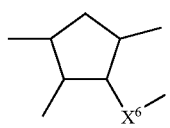
(15)

In the general formula (15), $X^6$ represents a single bond or —$CH_2$—. The other tetracarboxylic acid dianhydride containing the general formula (15) includes 2-12 and 2-21 in Tables 6 and 7 as described above.

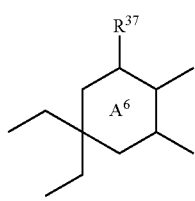
(16)

In the general formula (16), $R^{37}$ represents H, or a methyl, ethyl, or phenyl group. $A^6$ represents a cyclohexane ring or a benzene ring. The other tetracarboxylic acid dianhydride containing the general formula (16) includes 2-35 and 2-36 in Table 8 as described above.

(17)

In the general formula (17), w1 and w2 each represent 0 or 1 provided that w2=0 does not occur when w1=1. The other tetracarboxylic acid dianhydride containing the general formula (17) includes 2-30 and 2-31 in Tables 7 and 8 as described above.

The molar ratio of the tetracarboxylic acid dianhydride containing an unsaturated bond and the diamines containing an unsaturated bond (i.e., component A) to the total amount of the raw materials of the polyamic acid is preferably 0.3 to 1.0, more preferably 0.5 to 1.0 from the standpoint of bringing sufficient alignment property of liquid crystal. The amounts of other tetracarboxylic acid dianhydride and diamine (i.e., component B) used can be appropriately determined depending on various physical properties such as: the structures of $A^1$ to $A^4$; color development and photo-alignment properties of polyamic acid to be obtained; and electric characteristic properties and pre-tilt angle of a liquid crystal display element using a photo-alignment film to be obtained.

The photo-alignment film of the present invention can be obtained by: forming a film of a polyamic acid solution (varnish) that contains a polyamic acid prepared by reacting a diamine with a tetracarboxylic acid dianhydride, which are raw materials of the polyamic acid, and a solvent for dissolving the polyamic acid; applying light to the polyamic acid film to align the polyamic acid; and imidizing the polyamic acid in the film irradiated with light.

The polyamic acid is a reaction product of the tetracarboxylic acid dianhydride with the diamine as described above and is a component capable of forming a photo-alignment film containing a polyimide as a main component. In addition to the polyamic acid resulting from the reaction of a tetracarboxylic acid dianhydride with a diamine in equal amounts, for example, such a polyamic acid may be (1) a partial polyimide resulting from a ring-closing reaction of polyamic acid by partial dehydration or (2) a polyamic acid/polyamide copolymer resulting from a reaction of substituting part of a tetracarboxylic acid dianhydride used as a raw material of the polyamic acid with an organic dicarboxylic acid. When any one of those polymers is used in the photo-alignment film of the present invention, a decrease in enhancing effect on the ability of liquid crystal alignment associated with imidization may occur. Thus, the percentage of polyimide or polyamide is preferably as small as possible. In addition, the polymerization degree of the polyamic acid is not specifically limited. However, for example, a weight average molecular weight of the polyamic acid is preferably 10,000 or more for preventing an alignment film from time degradation, and preferably 200,000 or less for easy handling.

The solvent used may be any solvent known in the art, which is able to dissolve the polyamic acid and other components described below. The solvent may be, for example, one of N-methyl-2-pyrrolidone (NMP), dimethyl formamide (DMF), dimethyl acetamide (DMAc), dimethyl sulfoxide (DMSO), ethylene glycol monobutyl ether (BC), ethylene glycol monoethyl ether, and γ-butyrolactone, or a combination of two or more of them.

For more effectively bringing characteristics features requested of a photo-alignment film, the polyamic acid may be mixed with any other polyamic acid (hereinafter, such a blend of a plurality of polymers is referred to as a "polymer blend"). In this case, for providing the photo-alignment film with sufficient photo-alignment properties, the content of the polyamic acid in the present invention is preferably 50% by weight or more, more preferably 80% by weight more with respect to the other solid content.

When a plurality of polymers having different levels of surface energies in the case of thinning are used in the above polymer blend, a component having a low surface tension tends to be spontaneously segregated on the surface of the film. JP 843831 A discloses a method involving carrying out polymer blending to form a film having good liquid crystal alignment property on the surface of an alignment film and a film bringing a good electric property in bulk (in the film) for obtaining an alignment film excellent in both properties.

The polymer blending can be also carried out in the present invention. In this case, for providing a photo-alignment film with high alignment property and a high voltage holding ratio, it is preferable that a polyamic acid expressing a pre-tilt angle be provided as a component having a low surface tension and the polyamic acid of the present invention be selected as a polymer bringing a larger surface tension. At this time, the polyamic acid of the present invention may be used as a polyamic acid expressing a pre-tilt angle. The surface tensions of polymers to be blended can be adjusted depending on the structure of a polyamic acid (the presence or absence of a side chain or/and fluorine or silicon) or the molecular weight thereof, or the like.

For allowing the photo-alignment film to express more excellent properties, the polyamic acid of the present invention may be further mixed with one or more polymers selected from all other polymers known in the art. In this case, the percentage of the polyamic acid in the present invention in the whole polymers is preferably 50% by weight or more, more preferably 80% by weight or more for exerting the effects of the present invention.

The concentrations of the polyamic acid in the present invention and other solid contents are not specifically limited, and may be optimized based on various coating methods as described below. In general, for preventing uneven coating, pin-hole formation, or the like at the time of coating, they may each be preferably 0.1 to 30% by weight, more preferably 1 to 10% by weight with respect to the weight of varnish.

The addition of an organic silicon compound to the varnish in the present invention is preferable in term of adjusting the adhesiveness of a photo-alignment film to a glass substrate and the hardness of the photo-alignment film. The organic silicon compound to be added to the varnish in the present invention includes, but not specifically limited to, silane-coupling agents, such as aminopropyl trimethoxy silane, aminopropyl triethoxy silane, vinyl trimethoxysilane, N-(2-aminoethyl)-3-aminopropyl methyl dimethoxylsilane, N-(2-aminoethyl)-3-aminopropyl trimethoxysilane, vinyl triethoxysilane, 3-methacryloxy propyl trimethoxysilane, 3-glycidoxy propyl trimethoxysilane, 3-glycidoxypropyl methyl dimethoxysilane, and 2-(3,4-epoxy cyclohexyl) ethyl trimethoxysilane, and silicone oils, such as dimethyl polysiloxane, polydimethyl siloxane, and polydiphenyl siloxane.

The percentage of the organic silicon compound added to the varnish is not specifically limited as far as it does not affect the characteristics requested of the above photo-alignment film and alleviates a defect in display on a liquid crystal display element using the photo-alignment film. However, excess amounts of those materials added may lead to poor alignment of liquid crystals when a photo-alignment film is prepared therefrom. Therefore, those concentrations are each preferably in the range of 0.01 to 5% by weight, particularly preferably in the range of 0.1 to 3% by weight with respect to the weight of polymer in the varnish.

For preventing the characteristics of the photo-alignment film from variation with time and deterioration under environmental conditions, it is important to add the so-called crosslinking agent that allows polyamic acids to be connected with each other by reaction with carboxylic acid residues of the polyamic acids to the liquid crystal alignment agent of the present invention. Examples of such crosslinking agents include polyfunctional epoxy and isocyanate materials as described in Patent No. 3049699, JP 2005-275360 A, and JP 10-212484 A. In addition, any material as a result of the reaction of the crosslinking agent itself to form a polymer having a net-like structure that improves the strength of a liquid crystal alignment film using a liquid crystal alignment agent prepared using a polyamic acid or a polyimide can be used for a purpose similar to that described above. The crosslinking agent may be a polyfunctional vinyl ether, maleimide, a bis-allylnadiimide derivative, or the like as described in JP 10-310608 A, JP 2004-341030 A, or the like. Further, the crosslinking agent used in the present invention may be any crosslinking agent other than those mentioned above.

The percentage of the crosslinking agent to the polymer (polyamic acid or polyimide) used in preparation of the liquid crystal alignment agent of the present invention is preferably in the range of 5 to 200% by weight, more preferably in the range of 10 to 100% by weight for exerting the effects of the present invention.

From the standpoint of bringing sufficient alignment property to a liquid crystal composition, the photo-alignment film of the present invention will be preferably manufactured by the following procedures:

(1) The varnish is applied onto a substrate by a brush-painting method, a steeping method, a spinner method, a spray method, a printing method, or the like;
(2) A solvent is vaporized from a varnish film formed on the substrate by heating at 50 to 120° C., preferably 80 to 100° C.;
(3) A polyamic acid in the film is aligned by applying linearly polarized light to the film; and
(4) The film in which the polyamic acid is aligned is imidized by heating at 150 to 400° C., preferably 180 to 280° C.

Further, if there is a need of expressing a predetermined pre-tilt angle in a liquid crystal display element using the photo-alignment film of the present invention as a liquid crystal alignment film, expression of the pre-tilt angle can be carried out by a method involving applying linearly polarized light at a given angle against a substrate when the light irradiate, or a method involving combining irradiation with linearly polarized light in the vertical direction of a substrate with unpolarized irradiation at a given angle against the substrate.

Further, before the application of varnish, the surface of a substrate is treated with a silane coupling agent and a film is then formed thereon, thereby improving the adhesiveness of the film to the substrate.

In the production of the photo-alignment film of the present invention, linearly polarized light is used for aligning the polyamic acid. The main chain of the polyamic acid is aligned in the direction perpendicular or parallel to the polarization direction of linearly polarized light by the application of the linearly polarized light. The linearly polarized light is not specifically limited so far as it aligns the polyamic acid in the film. The exposure energy of linearly polarized light applied in a photo-alignment treatment of the polyamic acid is preferably 1 J/cm² or more. In addition, the wavelength of the linearly polarized light is preferably 300 to 400 nm. The application angle of the linearly polarized light to the surface of the film is not specifically limited. However, when there is a need of bringing a strong alignment-restraining force on the liquid crystal, the application angle is preferably as perpendicular as possible to the surface of the film from a viewpoint of shortening the time of the alignment treatment.

In the production of the photo-alignment film of the present invention, when the expression of a pre-tilt angle is required, light to be applied to the film may be polarized light or non-polarized light. The exposure energy of light to be applied to the film when the expression of a pre-tilt angle is required is preferably 1 J/cm² or more and the wavelength of the light is preferably 300 to 400 nm. When the expression of a pre-tilt angle is required, the application angle of light to the surface of the film is preferably 30 to 60° in terms of shortening the time of an alignment treatment.

In the photo-alignment film of the present invention, the polyimide main chain of the photo-alignment film has an alignment index Δ determined from the following equation α of preferably 0.5 or more for sufficiently exerting the alignment-restraining force on the liquid crystal when the photo-alignment film is used as a liquid crystal alignment film and for preventing an increase in alignment defect. The larger the alignment index Δ is, the more preferable it is. However, the alignment index is preferably 30 or less, more preferably 0.9 to 10 for improving the productivity when a photo-alignment film is manufactured and for preventing the photo-alignment film from a decrease in performance due to photolysis.

$$\Delta = (|A_\parallel - A^\perp|) / \{(A_\parallel + A^\perp) \times d\} \tag{$\alpha$}$$

In the equation (α), A|| represents a peak value of an absorption band or an integrated absorbance due to a C—N—C stretching vibration of an imide ring at a wave number of about 1,360 cm⁻¹ when linearly-polarized infrared light is applied perpendicular to the surface of the photo-alignment film so that the polarization direction of the infrared light is in parallel to an average alignment direction of the polyimide main chain, $A^\perp$ represents a peak value of an absorption band or integrated absorbance of the imide ring due to the C—N— stretching vibration at a wave number of about 1,360 cm⁻¹ when the linearly-polarized applied light is applied perpendicular to the surface of the photo-alignment film so that the polarization direction of the infrared light is in perpendicular to the average alignment direction of the polyimide main chain, and d represents a film thickness (nm) of the photo-alignment film.

Both A|| and $A^\perp$ can be obtained as described below. A polarizer is arranged between an optical source of an infrared spectrophotometer (preferably FT-IR) and a sample holder for retaining a sample having a substrate and a photo-alignment film formed on the surface of the substrate. The sample is fixed on the sample holder so that the alignment direction of the main chain of polyamide is aligned in the direction parallel to the polarization direction of the polarizer. An infrared absorbance of the sample is measured. Subsequently, an infrared absorbance is measured such that the polarizer is turned 90 degrees and the polarization direction of the infrared light that has passed through the polarizer is perpendicular to the alignment direction of the main chain of polyimide in a state where the sample is held on the sample holder. Further, this method uses a sample prepared on a substrate, such as silicon or calcium fluoride (fluorite: $CaF_2$), through which infrared light passes.

d can be determined using a known film thickness measuring apparatus, such as a stylus profilometer or an ellipsometer. In addition, d can be adjusted depending on the viscosity of the varnish or conditions for coating the substrate with the varnish. The viscosity of the varnish can be adjusted depending on the concentration of a solid content such as polyamic acid and the curing (stirring time) of the varnish.

Further, the average alignment direction of the polyimide main chain in the photo-alignment film refers to a direction in which the polyimide main chain aligns on average when the photo-alignment film is viewed from a direction perpendicular to the surface of the photo-alignment film. The average alignment direction can be evaluated from a positive or negative sign of $A_\parallel - A^\perp$ and the value thereof when the photo-alignment film is turned around a rotation axis, a line vertical to the surface of the photo-alignment film while linearly-polarized infrared light is vertically applied to the surface of the photo-alignment film. In other words, when the $A_\parallel - A^\perp$ is the positive and maximum value, the average alignment direction of the polyimide main chain is in parallel to the polarization direction of linearly polarized light. When the $A_\parallel - A^\perp$ is the negative and minimum value, the average alignment direction of the polyimide main chain is perpendicular to the polarization direction of the linearly polarized light.

The photo-alignment film of the present invention can be used for controlling the alignment of an optical compensation material and any one of all other liquid crystal materials, except the alignment of a liquid crystal composition for a liquid crystal display.

The present invention provides a liquid crystal display element having: a pair of oppositely-arranged substrates; electrodes formed on one or both of oppositely-facing surfaces of the pair of the substrates; liquid crystal alignment film formed on each of the oppositely-facing surface of the pair of the substrates; and a liquid crystal layer formed between the pair of the substrates, in which the liquid crystal alignment film is the photo-alignment film of the present invention.

The substrate used is any substrate suitable for the use thereof. The substrate is preferably a transparent substrate made of glass or the like in terms of display. From the viewpoint of confirming the alignment index Δ of the polyimide main chain in the photo-alignment film, an infrared light permeable substrate made of silicon, calcium fluoride, or the like is preferable.

The electrode is not specifically limited so far as it is formed on one side of the substrate. The electrode may be, for example, ITO or a deposited metal film. In addition, the electrodes may be formed on one side of the substrate, or may be formed in a desired patterned shape, for example, formed by patterning. The desired shape of the electrode may be, for example, a comb shape or a zigzag structure. The electrodes may be formed on one substrate of the pair of substrates, or may be formed on both substrates. The mode of forming an electrode varies depending on the type of a liquid crystal display element. For example, in the case of an IPS-type liquid crystal display element, an electrode is arranged on one substrate of the pair of substrates. On the other hand, in the case of another liquid crystal display element, electrodes are arranged on both substrates of the pair of substrates. The liquid crystal alignment film is formed on the substrate or the electrode.

The liquid crystal layer is formed such that a liquid crystal composition is sandwiched between the pair of substrates in which surfaces on which the respective liquid crystal alignment films are formed are oppositely. For forming the liquid crystal layer, if required, a spacer, such as a fine particle or a resin sheet, may be placed between the paired substrates to form an appropriate space.

The liquid crystal composition used is not specifically limited and may be any liquid crystal composition known in the art.

The photo-alignment film of the present invention can improve the characteristics of all liquid crystal compositions known in the art when a liquid crystal display element is formed as a liquid crystal alignment film. In addition, the photo-alignment film of the present invention, which is manufactured by the method described above, shows a large alleviating effect on an alignment defection of a large-screen display on which a rubbing treatment is hardly carried out. Such a large-screen display is driven under control with TFT. Further, a liquid crystal composition used in the TFT-type liquid crystal display element is described in any one of Japanese Patent No. 3086228, Japanese Patent No. 2635435, JP 05-501735 A, and JP 09-255956 A. Therefore, the photo-alignment film of the present invention is preferably used in combination with a liquid crystal composition as described in any one of those documents.

In a VA-type liquid crystal display element, for improving a viewing angle, the direction of a liquid crystal composition, which falls down when an electric field is applied thereon, is controlled radially. As one of approaches for that purpose, the following approach is considered: a mask is placed on the photo-alignment film and a plurality of alignment treatments are then carried out. The photo-alignment film of the present invention is also suitable for carrying out such a division of alignment.

The pre-tilt angle of the liquid crystal display element of the present invention can be measured, for example, by a crystal rotation method using an apparatus for evaluating the characteristics of liquid crystal, Type OMS-CA3, manufactured by Chuo Precision Industrial Co., Ltd., as described in Journal of Applied Physics, Vol. 48, No. 5, p. 1783-1792 (1977).

The liquid crystal display element of the present invention is excellent in electric properties involved in reliability of the liquid crystal display element. The electric properties include a voltage holding ratio and an ion density.

The voltage holding ratio (VHR) represents the display property of the liquid crystal display element, which is a percentage of a voltage retained in the liquid crystal display element to the voltage applied thereon during a frame. For preventing display defects, it is preferable that the liquid crystal display element of the present invention have a voltage holding ratio of 90.0% or more measured at a temperature of 60° C. using a square wave having a frequency of 30 Hz and 4.5 V and a voltage holding ratio of 85.0% or more measured at a temperature of 60° C. using a square wave having a frequency of 0.3 Hz and 4.5 V.

The ion density is known as an indicator that indicates the behavior of impurity ions in the liquid crystal display element. The ion density of the liquid crystal display element of the present invention is preferably 500 pC or less in terms of preventing the liquid crystal display element from image sticking.

EXAMPLES

Hereinafter, a manufacturing method and effects of the photo-alignment film of the present invention will be specifically described with reference to examples. In examples, NMR was measured in dimethyl sulfoxide. Molecular-weight measurement was carried out using GPC, in which a standard solution used was polystyrene and an elute solution used was DMF. A viscosity was measured using a rotating viscometer (TV-20, manufactured by Toki Sangyo Co., Ltd.). Light application was carried out using a 250-W high-pressure mercury lamp manufactured by Iuchi Seieido Co., Ltd., and UV at a wavelength of about 310 to 380 nm was applied. The application was carried out in the air at room temperature. By the way, the present invention will not be limited to any one of these examples.

Method of evaluating liquid crystal display element

Hereinafter, a method of evaluating a liquid crystal display element used in an example will be described.

1. Alignment Properties

A visual inspection was carried out by polarization microscopic observation.

2. Pre-tilt Angle

Evaluation was carried out by the crystal rotation method.

3. Voltage Holding Ratio

Evaluation was carried out in two ways in accordance with a method as described in "Mizushima et al., Preprints of 14th Symposium on Japanese Liquid Crystal Society, p78". The first measurement conditions were a gate width of 69 μs, a frequency of 30 Hz, and a wave height of ±4.5 V, and the measurement was carried out at a temperature of 60° C. The second measurement conditions were a gate width of 69 μs, a frequency of 0.3 Hz, and a wave height of ±4.5 V, and the measurement was carried out at a temperature of 60° C.

4. Measurement of Ion Content in Liquid Crystal (Ion Density)

The measurement was carried out using a system for measuring physical properties of liquid crystal, Type 6254, manufactured by Toyo Corporation, according to a method as described in "Oyo Buturi", vol. 65, No. 10, 1065 (1996). The measurement was carried out using a triangular wave having a frequency of 0.01 Hz and a voltage range of ±10 V at a temperature of 60° C.

5. Polarization IR

An FT-IR apparatus (spectrometer: Mattson Galaxy 3020, detector: mercury cadmium telluride) was used. The measurement was carried out at a measurement temperature of 32° C. and an integulation number of 400 times.

6. Film-Thickness Measurement

The measurement was carried out by application of laser beams at 632.8 nm using an ellipsometer (DVA-FL3G, manufactured by Mizojiri Optical Co., Ltd.).

Example 1

Preparation of Varnish A having the Following Composition:

| Structure | Name | mol % |
|---|---|---|
| $H_2N$-C6H4-C≡C-C6H4-$NH_2$ | 4,4'-Diaminotolane | 50 |
| PMDA structure | PMDA | 25 |
| CBTA structure | CBTA | 25 |

4,4'-diaminotolan (1.2534 g, 6.018 mmol) was dissolved in NMP (N-methyl-2-pyrrolidone, 22.5 g) and then added with PMDA (0.5901 g, 3.009 mmol) and CBTA (0.6564 g, 3.009 mmol) while the temperature of the mixture was kept at room temperature or lower. After stirring for 2 hours, BC (ethylene glycol monobutyl ether, 22.5 g) was added to the mixture. The viscosity of the resulting solution was 350 mPa·s. The solution was stirred at 60° C. for about 4 hours, thereby yielding varnish having a viscosity of 33 mPa·s (weight average molecular weight; 45,000).

Example 2

Preparation of Varnish B having the Following Composition:

| Structure | Name | mol % |
|---|---|---|
| $H_2N$-C6H4-C≡C-C≡C-C6H4-$NH_2$ | 4,4'-Diaminodiphenyl-1,4-butadiyne | 50 |

-continued

| | | mol % |
|---|---|---|
| 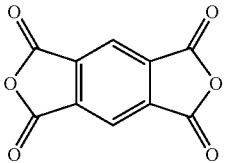 | PMDA | 25 |
| 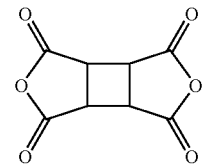 | CBTA | 25 |

4,4'-diaminodiphenyl-1,4-butadiyne (1.3216 g, 5.690 mmol) was dissolved in NMP (22.5 g) and then added with PMDA (0.6205 g, 2.845 mmol) and CBTA (0.5579 g, 2.845 mmol) while the temperature of the mixture was kept at room temperature or lower. After stirring for 2 hours, BC (22.5 g) was added to the mixture. The viscosity of the resulting solution was 170 mPa·s. The solution was stirred at 60° C. for about 2 hours, thereby yielding varnish having a viscosity of 28 mPa·s (weight average molecular weight; 37,000).

Example 3

Preparation of Varnish C having the Following Composition:

| | mol % |
|---|---|
| 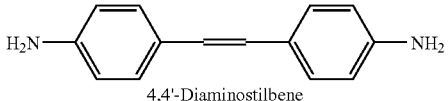<br>4,4'-Diaminostilbene | 50 |
| 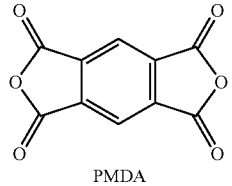<br>PMDA | 25 |
| 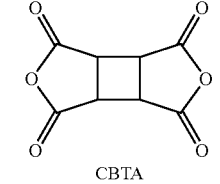<br>CBTA | 25 |

4,4'-diaminostilbene (1.2590 g, 5.592 mmol) was dissolved in NMP (22.5 g) and then added with PMDA (0.6535 g, 2.996 mmol) and CBTA (0.5875 g, 2.996 mmol) while the temperature of the mixture was kept at room temperature or lower. After stirring for 2 hours, BC (22.5 g) was added to the mixture. The viscosity of the resulting solution was 140 mPa·s. The solution was stirred at 60° C. for about 2 hours, thereby yielding varnish having a viscosity of 32 mPa·s (weight average molecular weight; 46,000).

Example 4

Synthesis of Compound (1-9) and Synthesis of the Following Varnish D Using the Same

| | mol % |
|---|---|
| 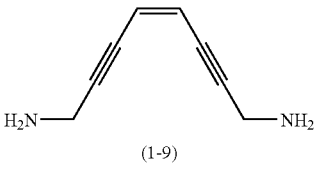<br>(1-9) | 50 |
| 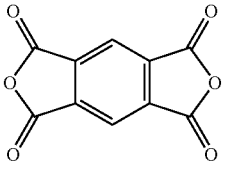<br>PMDA | 25 |
| 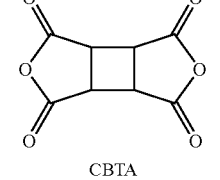<br>CBTA | 25 |

(Synthesis of Varnish)

Compound (1-9) (0.9829 g, 7.325 mmol) prepared according to U.S. Pat. No. 6,514,995 or J. Am. Chem. Soc., 123, 9675 (2001) was dissolved in NMP (22.5 g) and then added with PMDA (0.7183 g, 3.663 mmol) and CBTA (0.7989 g, 3.663 mmol) while the temperature of the mixture was kept at room temperature or lower. After stirring for 2 hours at 60° C., BC (22.5 g) was added to the mixture. The viscosity of the resulting solution was 210 mPa·s. The solution was stirred at 60° C. for about 4 hours, thereby yielding varnish having a viscosity of 31 mPa·s (weight average molecular weight; 38,000).

Example 5

Preparation of Varnish E having the Following Composition:

| | mol % |
|---|---|
| Diphenyl-1,4-butadiyne-3,3',4,4'-tetracarboxylic acid anhydride | 50 |
| DDM (H₂N–C₆H₄–CH₂–C₆H₄–NH₂) | 50 |

DDM (1.8340 g, 9.250 mmol) was dissolved in NMP (22.5 g) and then added with diphenyl-1,4-butadiyne-3,3',4,4'-tetracarboxylic acid dianhydride (3.1660 g, 9.250 mmol) while the temperature of the mixture was kept at room temperature or lower. After stirring for 2 hours, BC (22.5 g) was added to the mixture. The viscosity of the resulting solution was 58 mPa·s. The solution was stirred at 50° C. for about 1 hour, thereby yielding varnish having a viscosity of 30 mPa·s (weight average molecular weight; 49,000).

Example 6

Synthesis of Compound (2-7) and Synthesis of the Following Varnish F Using the Same

| | mol % |
|---|---|
| (Compound 2-7: bis-phthalic anhydride with cis-butadiyne linker) | 50 |
| DDM | 50 |

(Synthesis of Compound (2-7))

A mixture of 4-ethynyl phthalic acid diethyl ester (10.0 g, 41 mmol), cis-1,2-dichloroethylene (2.0 g, 21 mmol), Pd(PPh₃)₄ (1.15 g, 1.0 mmol), and CuI (0.38 g, 2.0 mmol) was reacted in dibutyl amine (50 mL) under a nitrogen atmosphere at room temperature for 24 hours. A solvent was distilled off under reduced pressure and the residue was then purified by column chromatography (silica gel/toluene : ethyl acetate=5:1 (v/v) ), thereby yielding a target compound (17.3 g, 82% in yield).

The resulting compound (17.0 g, 32.9 mmol) was dissolved in ethanol (80 mL) and then added with a 10% aqueous sodium hydroxide solution (60 mL), followed by refluxing for 1 hour. After cooling, a solvent was distilled off and the residue was then added with 100 mL of 6-M HCl. A separated precipitate was filtrated and then dried in a vacuum at 100° C. for 10 hours, thereby yielding a target product (11.7 g, 91% in yield).

A mixture of the resulting compound (11.0 g, 27.2 mmol) and acetic acid anhydride (50 ml) was refluxed for 3 hours. After cooling, a separated precipitate was filtrated and then dried in a vacuum at 80° C. for 5 hours, thereby yielding a target compound (2-7) (7.4 g, 74% in yield). The ¹H-NMR spectrum peak of the resulting compound (2-7) was shown below.

¹H NMR (ppm); 8.00 (d, 2H, J=1.50 Hz), 7.96 (dd, 2H, J=8.00, 1.50 Hz), 7.78 (dd, 2H, J=8.00, 1.50 Hz), 6.52 (s, 2H).

(Synthesis of Varnish)

Compound (2-7) (1.6251 g, 4.413 mmol) was dissolved in NMP (22.5 g) and then added with DDM (0.8748 g, 4.413 mmol) while the temperature of the mixture was kept at room temperature or lower. After stirring for 2 hours at 60° C., BC (22.5 g) was added to the mixture. The viscosity of the resulting solution was 127 mPa·s. The solution was stirred at 60° C. for about 4 hours, thereby yielding varnish having a viscosity of 37 mPa·s (weight average molecular weight; 49,000).

Example 7

Preparation of Varnish G having the Following Composition:

| | mol % |
|---|---|
| 4,4'-Diaminodiphenyl-1,4-butadiyne (H₂N–C₆H₄–C≡C–C≡C–C₆H₄–NH₂) | 40 |

| | mol % |
|---|---|
| (1-40) structure with C7H15 | 10 |
| PMDA | 25 |
| CBTA | 25 |

4,4'-diaminodiphenyl-1,4-butadiyne (0.9256 g, 3.985 mmol) and compound (1-40) (0.5427 g, 0.9962 mmol) were dissolved in NMP (22.5 g) and then added with PMDA (0.5432 g, 2.491 mmol) and CBTA (0.4884 g, 2.491 mmol) while the temperature of the mixture was kept at room temperature or lower. After stirring for 2 hours, BC (22.5 g) was added to the mixture. The viscosity of the resulting solution was 98 mPa·s. The solution was stirred at 60° C. for about 2 hours, thereby yielding varnish having a viscosity of 27 mPa·s (weight average molecular weight; 46,000).

Example 8

Preparation of Varnish H having the Following Composition:

| | mol % |
|---|---|
| (1-10) | 50 |
| PMDA | 50 |

A mixture of 4-amino-4'-bromodiphenyl methane (74 g, 280 mmol) prepared according to J. Am. Chem. Soc., 68, 2600 (1946), trimethyl silyl acetylene (30 g, 310 mmol), PdCl$_2$(PPh$_3$)$_2$ (4.9 g, 7.0 mmol), and copper iodide (2.6 g, 14.0 mmol) was stirred in triethylamine (150 ml) at 50° C. for 30 minutes, followed by refluxing for 3 hours. After cooling, a solvent was distilled off under reduced pressure and the residue was then added with toluene (300 mL), followed by washing three times with pure water (300 mL) An organic layer was dried over anhydrous MgSO$_4$ and then filtrated, followed by distilling the solvent off under reduced pressure. A crude product of the resulting 4-amino-4'-trimethylsilyl ethynyl diphenylmethane was not purified but used in a subsequent reaction.

A solution of tetrabutyl ammonium fluoride in THF (1 M, 293 mL) was added to the above product (82 g, 290 mmol) at room temperature or lower. The solution was stirred overnight at room temperature and a solvent was then distilled off under reduced pressure. The resultant was subjected to an extraction operation with toluene-pure water similar to the foregoing, and then, drying, and the solvent was distilled off under reduced pressure. The resulting crude product was purified by column chromatography (silica gel/toluene), thereby yielding 4-amino-4'-ethyldiphenyl methane (48 g in yield, 82% in yield).

A mixture of the above compound (5.0 g, 24 mmol), 1,4-diiodobenzene (3.6 g, 11 mmol), PdCl$_2$(PPh$_3$)$_2$ (840 mg, 1.2 mmol), and copper iodide (460 mg, 2.4 mmol) was stirred in triethyl amine (30 ml) at 50° C. for 30 minutes, followed by refluxing for 3 hours. After cooling, a solvent was distilled off under reduced pressure. The residue was purified by column chromatography (silica gel/methylene chloride, and then methylene chloride:methanol=50:1 (v/v)), thereby yielding target compound (1-10) (1.5 g in yield, 26% in yield). The $^1$H-NMR spectrum peak of the resulting compound (1-10) was shown below.

$^1$H NMR; 7.48 (s, 4H), 7.43 (d, 4H, J=8.15 Hz), 7.16 (d, 4H, J=8.15 Hz), 6.97 (d, 4H, J=8.20 Hz), 6.64 (d, 4H, J=8.40 Hz), 3.89 (s, 4H), 3.59 (brs, 4H).

Compound (1-10) (0.8642 g, 1.769 mmol) was dissolved in NMP (11.2 g) and then added with PMDA (0.3858 g, 1.769 mmol) while the temperature of the mixture was kept at room temperature or lower. After stirring at 60° C. for 2 hours, BC (11.2 g) was added to the mixture. Subsequently, the mixture was stirred at 70° C. for about 3 hours, thereby yielding varnish H having a viscosity of 40 mPa·s (weight average molecular weight; 96,000).

Example 9

Preparation of Varnish I having the Following Composition was stirred at 70° C. for about 2 hours, thereby yielding varnish I having a viscosity of 38 mPa·s (weight average molecular weight; 83,000).

Example 10

Three grams of varnish A was weighed and placed in a sample bottle, and then scaled up to 5 g by addition of BC. The obtained polyamic acid solution of about 3% by weight was dropped on a transparent glass substrate where an ITO electrode was mounted on one side thereof, followed by coating by the spinner method (2,300 rpm, 15 seconds). After coating, the substrate was heated at 80° C. for 5 minutes and a solvent was then vaporized, followed by applying linearly polarized light through a polarizer (about an energy of 5 J/cm$^2$ at 365 nm). The substrate after the photo-irradiation was placed in an oven and then heated at 230° C. for 30 minutes, thereby resulting in a photo-alignment film having a film thickness of about 60 nm.

In two substrates, on which the above photo-alignment films were formed on the respective ITO electrodes, surfaces on which the photo-alignment films were respectively formed were oppositely arranged: so that the polarization directions of the linearly polarized light beams applied to the respective photo-alignment films would be parallel to each other; and so that a space was formed between the opposite photo-alignment films for injecting a liquid crystal into the space; thereby constructing liquid crystal cell A (liquid crystal display ele-

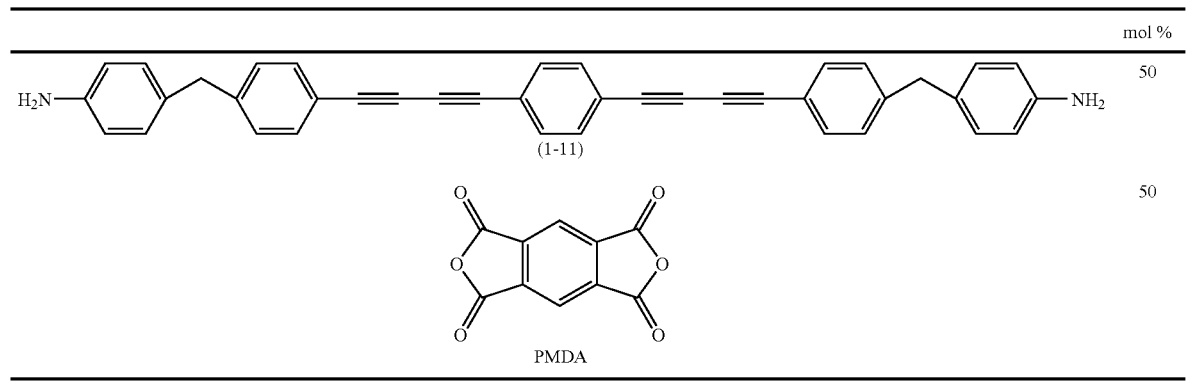

A mixture of the above 4-amino-4'-ethynyl diphenyl methane (5.0 g, 24 mmol), 1,4-diiodoethynyl benzene (4.5 g, 12 mmol) prepared according to Tetrahedron Lett., 40, 8579 (1999), PdCl$_2$(PPh$_3$)$_2$ (840 mg, 1.2 mmol), and copper iodide (460 mg, 2.4 mmol) was stirred in triethylamine (30 mL) at 50° C. for 30 minutes, followed by refluxing for 3 hours. After cooling, a solvent was distilled off under reduced pressure and the residue was then purified by column chromatography (silica gel/methylene chloride, and then methylene chloride:methanol=50:1 (v/v)), thereby yielding target compound (1-11) (2.2 g in yield, 17% in yield). The $^1$H-NMR spectrum peak of the resulting compound (1-11) was shown below.

$^1$H NMR; 7.40 (s, 4H), 7.36 (d, 4H, J=8.20 Hz), 7.18 (d, 4H, J=8.20 Hz), 6.97 (d, 4H, J=8.40 Hz), 6.64 (d, 4H, J=8.40 Hz), 3.89 (s, 4H), 3.60 (brs, 4H).

Compound (1-11) (0.8888 g, 1.656 mmol) was dissolved in NMP (11.2 g) and then added with PMDA (0.3612 g, 1.656 mmol) while the temperature of the mixture was kept at room temperature or lower. After stirring at 60° C. for 2 hours, BC (11.2 g) was added to the mixture. Subsequently, the mixture ment) having a cell thickness of 7 μm. Liquid crystal composition A described below was introduced into the cell.

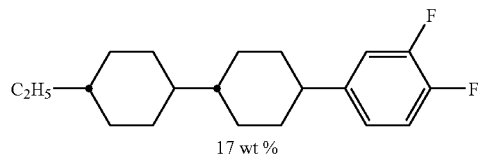

17 wt %

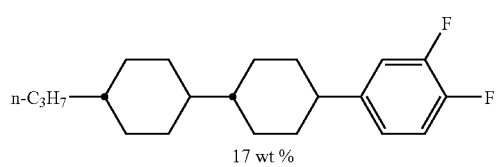

17 wt %

-continued

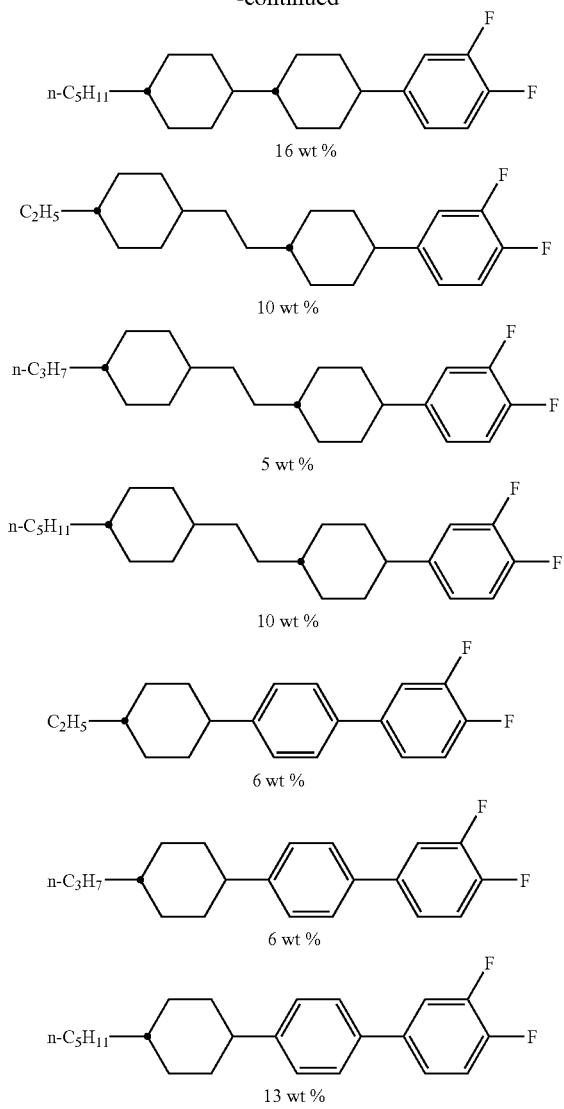

Visual observation was conducted on the liquid crystal cell A. As a result, the so-called flow alignment, in which liquid crystal was aligned in the flowing direction of the liquid crystal, was slightly observed. The liquid crystal cell A was subjected to an isotropic treatment at 110° C. for 30 minutes, followed by cooling down to room temperature. The liquid crystal cell A was observed through a microscope, but no alignment defect of the liquid crystal was observed. A polarizing microscope was brought into a state of crossed nicols and clearly turned into light and dark states when the liquid crystal cell A was rotated (minute white points were light leakage due to a gap material). The dark state of the liquid crystal cell A is illustrated in FIG. 1.

The pre-tilt angle, VHR (voltage holding ratio), and ion density of the liquid crystal cell A are listed in Table 9 below.

TABLE 9

| | |
|---|---|
| Pre-tilt angle (degree) | 0.1 |
| VHR (%) 30 Hz | 99.1 |
| 0.3 Hz | 90.5 |
| Ion density (pC) | 220 |

Example 11

Liquid crystal cell B was prepared in a manner similar to that of Example 10 described above, except that varnish A was replaced with varnish B. The liquid crystal cell B did not show any flow alignment before the isotropic treatment. After the isotropic treatment, the photograph of the liquid crystal cell B was observed through a polarizing microscope. As a result, no alignment defect was found in the liquid crystal. The liquid crystal composition was clearly aligned. In addition, when the liquid crystal cell B was rotated, clear light and dark states were observed. The photograph of the dark state of the liquid crystal cell B is illustrated in FIG. 2 (minute white points were light leakage due to a gap material). The pre-tilt angle, VHR, and ion density of the liquid crystal cell B are listed in Table 10 below.

TABLE 10

| | |
|---|---|
| Pre-tilt angle (degree) | 0.0 |
| VHR (%) 30 Hz | 99.0 |
| 0.3 Hz | 90.0 |
| Ion density (pC) | 261 |

Example 12

Liquid crystal cell C was prepared in a manner similar to that of Example 10 described above, except that varnish A was replaced with varnish C. The liquid crystal cell C showed a slight flow alignment before the isotropic treatment. After the isotropic treatment, the photograph of the liquid crystal cell C was observed through a polarizing microscope. As a result, no alignment defect was found in the liquid crystal. The liquid crystal composition was clearly aligned. In addition, when the liquid crystal cell C was rotated, it was turned into light and dark states almost in a similar manner as Example 10. The pre-tilt angle, VHR, and ion density of the liquid crystal cell C are listed in Table 11 below.

TABLE 11

| | |
|---|---|
| Pre-tilt angle (degree) | 0.1 |
| VHR (%) 30 Hz | 98.5 |
| 0.3 Hz | 87.2 |
| Ion density (pC) | 340 |

Example 13

Liquid crystal cell E was prepared in a manner similar to that of Example 10 described above, except that varnish A was replaced with varnish E. The liquid crystal cell E did not show any flow alignment before the isotropic treatment. After the isotropic treatment, the photograph of the liquid crystal cell E was observed through a polarizing microscope. As a result, no alignment defect was found in the liquid crystal. The liquid crystal composition was clearly aligned. In addition, when the liquid crystal cell E was rotated, it was turned into light and dark states almost in a similar manner as Example 11. The pre-tilt angle, VHR, and ion density of the liquid crystal cell E are listed in Table 12 below.

TABLE 12

| | |
|---|---|
| Pre-tilt angle (degree) | 0.0 |
| VHR (%) 30 Hz | 99.2 |

TABLE 12-continued

| | |
|---|---|
| 0.3 Hz | 90.5 |
| Ion density (pC) | 154 |

Example 14

Liquid crystal cell G was prepared in a similar manner as Example 10 described above, except that varnish A was replaced with varnish cell G and linearly polarized light was applied at an angle of 70 degrees to the substrate. The liquid crystal cell G did not show any flow alignment before the isotropic treatment. After the isotropic treatment, the photograph of the liquid crystal cell G was observed through a polarizing microscope. As a result, no alignment defect was found in the liquid crystal. The liquid crystal composition was clearly aligned. In addition, when the liquid crystal cell G was rotated, it was turned into light and dark states almost in a similar manner as Example 11. The pre-tilt angle, VHR, and ion density of the liquid crystal cell G are listed in Table 13 below.

TABLE 13

| | |
|---|---|
| Pre-tilt angle (degree) | 2.3 |
| VHR (%) 30 Hz | 99.2 |
| 0.3 Hz | 90.4 |
| Ion density (pC) | 181 |

Example 15

Liquid crystal cell H was prepared in a manner similar to that of Example 10 described above, except that varnish A was replaced with varnish H. The liquid crystal cell H showed a slight flow alignment before the isotropic treatment. After the isotropic treatment, the photograph of the liquid crystal cell H was observed through a polarizing microscope. As a result, no alignment defect was found in the liquid crystal. The liquid crystal composition was clearly aligned. In addition, when the liquid crystal cell H was rotated, it was turned into light and dark states almost in a similar manner as Example 10. The pre-tilt angle, VHR, and ion density of the liquid crystal cell H are listed in Table 14 below.

TABLE 14

| | |
|---|---|
| Pre-tilt angle (degree) | 0.1 |
| VHR (%) 30 Hz | 90.3 |
| 0.3 Hz | 83.4 |
| Ion density (pC) | 580 |

Example 16

Liquid crystal cell I was prepared in a manner similar to that of Example 10 described above, except that varnish A was replaced with varnish I. The liquid crystal cell I did not show any flow alignment before the isotropic treatment. After the isotropic treatment, the photograph of the liquid crystal cell I was observed through a polarizing microscope. As a result, no alignment defect was found in the liquid crystal. The liquid crystal composition was clearly aligned. In addition, when the liquid crystal cell I was rotated, it was turned into light and dark states almost in a similar manner as Example 11. The pre-tilt angle, VHR, and ion density of the liquid crystal cell I are listed in Table 15 below.

TABLE 15

| | |
|---|---|
| Pre-tilt angle (degree) | 0.1 |
| VHR (%) 30 Hz | 90.5 |
| 0.3 Hz | 84.7 |
| Ion density (pC) | 450 |

Comparative Example 1

Varnish J was prepared in a manner similar to that of Example 1 according to the following composition, using 4,4'-diaminochalcone as described in JP 11-15001 A (Viscosity; 14 mPa·s, weight average molecular weight; 24,000).

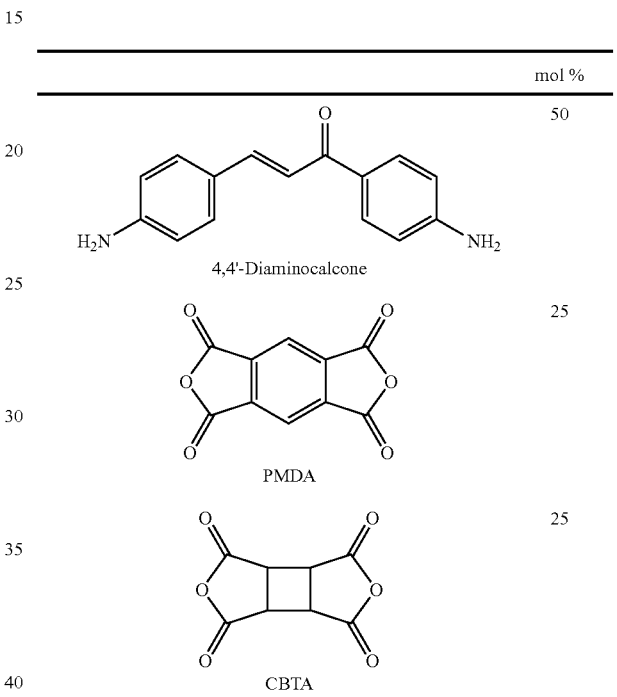

Liquid crystal cell J was prepared in a manner similar to that of Example 10, except that varnish A was replaced with varnish J. The liquid crystal cell J was observed through a polarizing microscope and showed an extensive flow alignment before the isotropic treatment. After the isotropic treatment, the liquid crystal cell J was observed through a polarizing microscope. As a result, extensive alignment defects were found in the liquid crystal. FIG. 3 shows a polarizing microscopic photograph that represents the dark state of the liquid crystal cell J. The pre-tilt angle, VHR, and ion density of the liquid crystal cell J are listed in Table 16 below.

TABLE 16

| | |
|---|---|
| Pre-tilt angle (degree) | 0.0 |
| VHR (%) 30 Hz | 95.7 |
| 0.3 Hz | 73.4 |
| Ion density (pC) | 1070 |

Comparative Example 2

Varnish K was prepared in a manner similar to that of Example 1 according to the following composition, using 4,4'-diaminoazo benzene as described in Mol. Cryst. Liq. Cryst. Vol. 412, 293 (2004) (viscosity; 37 mPa·s, weight average molecular weight; 58,000).

| | mol % |
|---|---|
| 4,4'-Diaminoazobenzene (H₂N—C₆H₄—N=N—C₆H₄—NH₂) | 50 |
| PMDA | 25 |
| CBTA | 25 |

Liquid crystal cell K was prepared in a manner similar to that of Example 10, except that varnish A was replaced with varnish K. The liquid crystal cell K was observed through a polarizing microscope and showed no flow alignment before the isotropic treatment. After the isotropic treatment, no alignment defect was found in the liquid crystal and clear alignment was observed. When the liquid crystal cell K was rotated, it was turned into light and dark states almost in a similar manner as Example 11. In addition, the pre-tilt angle, VHR, and ion density of the liquid crystal cell K are listed in Table 17 below. In this case, it is found that the film has good alignment properties but poor electric properties.

TABLE 17

| | |
|---|---|
| Pre-tilt angle (degree) | 0.0 |
| VHR (%) 30 Hz | 96.5 |
| 0.3 Hz | 78.8 |
| Ion density (pC) | 850 |

Comparative Example 3

Liquid crystal cell L was prepared by a method similar to that of Example 11, except that linearly polymerization was applied after a heat treatment of a polyamic acid film at 230° C. for 30 minutes. The liquid crystal cell L was observed through a polarizing microscope and showed a flow alignment before the isotropic treatment. After the isotropic treatment, the liquid crystal cell L was observed through a polarizing microscope. As a result, alignment defects were found in the liquid crystal. The photograph of the polarizing microscope, which showed that the liquid crystal cell L was in a dark state, was represented in FIG. 4. In addition, the pre-tilt angle, VHR, and ion density of the liquid crystal cell L are listed in Table 18 below.

TABLE 18

| | |
|---|---|
| Pre-tilt angle (degree) | 0.0 |
| VHR (%) 30 Hz | 95.1 |
| 0.3 Hz | 40.0 |
| Ion density (pC) | 1160 |

TABLE 18-continued

As is evident from the comparison between the above examples and the above comparative example, the liquid display element having the photo-alignment film of the present invention shows good alignment properties without causing defects in crystal liquid. In addition, the element has a higher VHR and a smaller ion density.

Examples 17 to 21

Photo-alignment films were prepared in a manner similar to those of Examples 10, 11, 12, 15, and 16, except that the substrates were replaced with silicon substrates. The results obtained by measuring the alignment indices A of the photo-alignment films by polarization IR are listed in Table 19 below.

TABLE 19

| Example | Varnish | Alignment index Δ | Film thickness (nm) |
|---|---|---|---|
| 17 | A | 0.91 | 83.0 |
| 18 | B | 1.51 | 70.8 |
| 19 | C | 0.99 | 73.9 |
| 20 | H | 0.85 | 79.3 |
| 21 | I | 1.23 | 75.3 |

Comparative Examples 4 and 5

Photo-alignment films were prepared in a manner similar to those of Comparative Examples 1 and 3, except that the substrates were replaced with silicon substrates. The results obtained by measuring the alignment indices Δ of the photo-alignment films by polarization IR are listed in table 20 below.

TABLE 20

| Comparative Example | Varnish | Alignment index Δ | Film thickness (nm) |
|---|---|---|---|
| 4 | J | 0.00 | 76.6 |
| 5 | B | 0.00 | 79.0 |

As is evident from Table 19 and Table 20, the photo-alignment films of Examples 17 to 21 show alignment indices Δ of 0.5 or more, more specifically 0.85 or more. In particular, the photo-alignment films of Examples 17 to 19 and 21 show alignment indices Δ of 0.5 or more, more specifically 0.9 or more, so that they can be found to have high abilities of liquid crystal alignment. On the other hand, it is considered that the photo-alignment films of Comparative Examples 4 and 5 may not have an ability of liquid crystal alignment at all.

By the way, the higher the voltage holding ratio under the first measurement conditions as described above, the better; when the voltage holding ratio is preferably 90.0% or more, more preferably 98.0% or more, still more preferably 98.5% or more and the voltage holding ratio under the second measurement conditions as descried above is preferably 83.0% or more, more preferably 85.0% or more, still more preferably 87.0% or more, a liquid crystal display element is excellent in that it does not cause a decrease in applied voltage until the subsequent voltage is applied after the application of a voltage, and no deterioration in display due to the declining voltage occurs.

Further, the less the ion density, the superior the liquid crystal display element. The ion density is preferably 600 pC or less, more preferably 500 pC or less, still more preferably 400 pC or less, most preferably 300 pC or less.

BRIEF DESCRIPTION OF THE DRAWINGS

FIG. 1 A polarizing microscopic photograph representing the dark state of liquid crystal cell A.
FIG. 2 A polarizing microscopic photograph representing the dark state of liquid crystal cell B.
FIG. 3 A polarizing microscopic photograph representing the dark state of liquid crystal cell J.
FIG. 4 A polarizing microscopic photograph representing the dark state of liquid crystal cell L.

The invention claimed is:

1. A photo-alignment film, which is formed by imidization after alignment of a polyamic acid generated using at least a diamine and a tetracarboxylic acid dianhydride as raw materials by light irradiation in a predetermined direction, wherein:
the diamine comprises one or more diamines containing an unsaturated bond each represented by a general formula (1) described below as component A of the diamine; the tetracarboxylic acid dianhydride comprises one or more tetracarboxylic acid dianhydrides containing an unsaturated bond each represented by a general formula (2) described below as component A of the tetracarboxylic acid dianhydride; or
the diamine comprises the one or more diamines containing unsaturated bonds as component A of the diamine, and the tetracarboxylic acid dianhydride comprises the one or two or more tetracarboxylic acid dianhydrides containing unsaturated bonds as component A of the tetracarboxylic acid dianhydride:

$$H_2N\text{-}A^1\text{-}T\text{-}A^2\text{-}NH_2 \quad (1)$$

where $A^1$ and $A^2$ each independently represent a divalent organic group, and T represents a divalent group comprising an unsaturated bond containing 1 to 3 carbon-carbon double bonds or 1 to 4 triple bond;

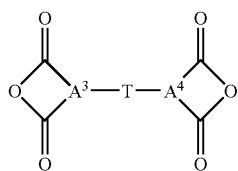
(2)

where $A^3$ and $A^4$ each independently represent a trivalent organic group, and T represents a divalent group comprising an unsaturated bond containing 1 to 3 carbon-carbon double bonds or 1 to 4 triple bonds.

2. The photo-alignment film according to claim 1, wherein the diamine containing an unsaturated bond comprises a diamine where $A^1$ and $A^2$ in the general formula (1) each independently represent an aromatic ring having 6 to 20 carbon atoms, an alicyclic group having 3 to 10 carbon atoms, or an alkylene group having 1 to 10 carbon atoms, and each may contain an oxy group and a carbonyl group, and T represents any group containing an unsaturated group selected from the group consisting of the following formulae (A) to (G):

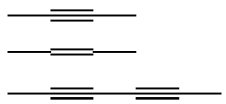
(A)
(B)
(C)
(D)
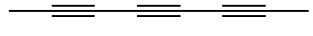
(E)
(F)
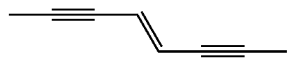
(G)
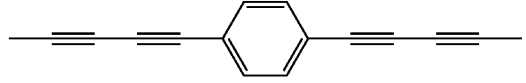

3. The photo-alignment film according to claim 1, wherein the tetracarboxylic acid dianhydride containing an unsaturated bond comprises a tetracarboxylic acid dianhydride where $A^3$ and $A^4$ in the general formula (2) each independently represent an aromatic ring having 6 to 20 carbon atoms or an aliphatic group having 1 to 20 carbon atoms and each may contain an oxy group and a carbonyl group, and T represents any group containing an unsaturated bond selected from the group consisting of the formulae (A) to (G).

4. The photo-alignment film according to claim 1, wherein the diamine further comprises one or more diamines each represented by a general formula (3) described below as component B of the diamine:

$$H_2N\text{—}R^1\text{—}NH_2 \quad (3)$$

where $R^1$ represents a divalent organic group selected from the groups represented by general formulae (5) to (8) described below:

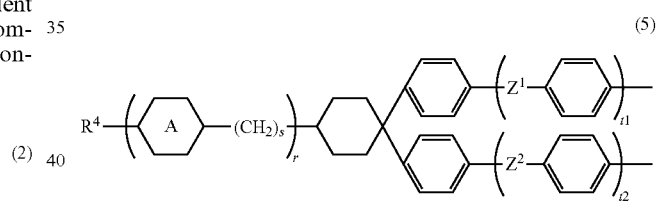
(5)

where $R^4$ represents H or an alkyl group having 1 to 12 carbon atoms, rings A each independently represent 1,4-phenylene or 1,4-cyclohexylene, $Z^1$ and $Z^2$ each independently represent a single bond, $CH_2$, $CH_2CH_2$, or O, r represents an integral number of 0 to 3, S's each independently represent an integral number of 0 to 5, t1 represents an integral number of 0 to 3, and t2 represents an integral number of 0 to 3, and any H of 1,4-phenylene or 1,4-cyclohexylene may be substituted with an alkyl group having 1 to 4 carbon atoms;

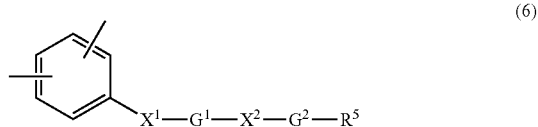
(6)

where $X^1$ and $X^2$ each represent a single bond, O, COO, OCO, NH, CONH, or an alkylene group having 1 to 12 carbon atoms, $G^1$ and $G^2$ each represent a single bond or a divalent group containing 1 to 3 rings selected from an aromatic ring and an alicyclic ring, and $R^5$ represents H, F, CN, OH, or an alkyl, perfluoroalkyl, or alkoxy group having 1 to 30 carbon atoms, a binding position of a substituent and positions of two free radicals to a benzene ring are arbitrary positions provided that, when $G^2$ is a single bond and $X^2$ is neither a single bond nor an alkylene group, $R^5$ is H or the alkyl group and when both $G^1$ and $G^2$ are single bonds, a total carbon atoms of $X^1$, $X^2$, and $R^5$ is 3 or more;

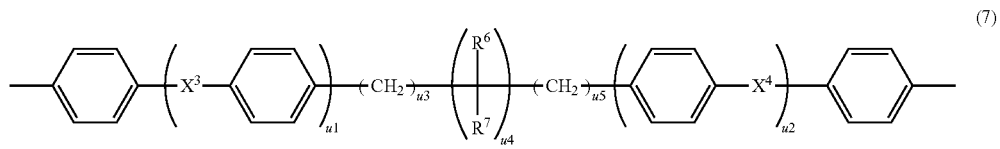
(7)

where $X^3$ and $X^4$ each independently represent a single bond, $CH_2$, $CH_2CH_2$, or O, $R^6$ and $R^7$ each independently represent H, an alkyl group having 1 to 12 carbon atoms, or a perfluoroalkyl group having 1 to 12 carbon atoms, u1, u2, u3, u4, and u5 each independently represent an integral number of 0 to 3, and any H of 1,4-phenylene may be substituted with an alkyl group having 1 to 4 carbon atoms;

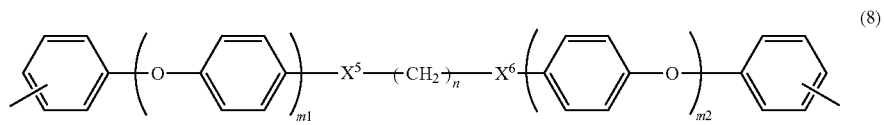
(8)

where $X^5$ and $X^6$ each independently represent a single bond, O, or S, m1 and m2 each independently represent 0 or 1, and n represents an integral number of 0 to 10, and binding positions of a free radical to a benzene ring is an arbitrary position.

5. The photo-alignment film according to claim 1, wherein the tetracarboxylic acid dianhydride further comprises one or more tetracarboxylic acid dianhydrides each represented by a general formula (4) described below as component B of the tetracarboxylic acid dianhydride:

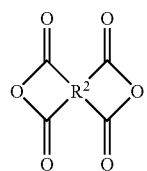
(4)

where $R^2$ represents a tetravalent group selected from groups represented by general formulae (9) to (17) described below:

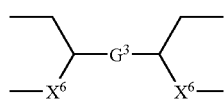
(9)

where $G^3$ represents a single bond, an alkylene group having 1 to 12 carbon atoms, 1,4-phenylene, or 1,4-cyclohexylene, and $X^6$'s each independently represent a single bond or $CH_2$;

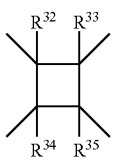
(10)

where $R^{32}$, $R^{33}$, $R^{34}$, and $R^{35}$ each independently represent H, or a methyl, ethyl, or phenyl group;

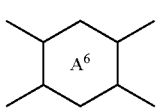
(11)

where a ring $A^6$ represents a cyclohexane ring or a benzene ring;

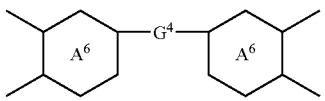
(12)

where $G^4$ represents a single bond, $CH_2$, $CH_2CH_2$, O, CO, S, $C(CH_3)_2$, or $C(CF_3)_2$, and rings $A^6$ each independently represent a cyclohexane ring or a benzene ring;

(13)

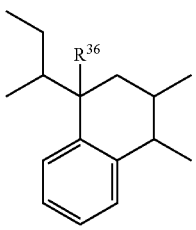

where $R^{36}$ represents H or a methyl group;

(14)

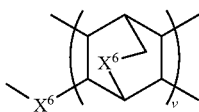

where $X^6$'s each independently represent a single bond or $CH_2$, and v represents 1 or 2;

(15)

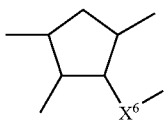

where $X^6$ represents a single bond or $CH_2$;

(16)

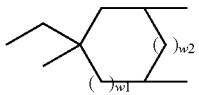

where $R^{37}$ represents H, or a methyl, ethyl, or phenyl group, and a ring $A^6$ represents a cyclohexane ring or a benzene ring;

(17)

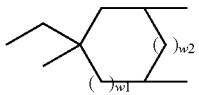

where w1 and w2 each independently represent 0 or 1 provided that there is no case that satisfies both w1=1 and w2=0 at once.

6. The photo-alignment film according to claim 2, wherein $A^1$ and $A^2$ of the general formula (1) are independently selected from the group consisting of structural formulae (I) to (V) described below and general formulae (VI) and (VII) described below:

(I)
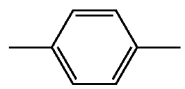

(II)
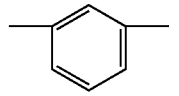

(III)
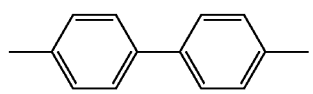

(IV)
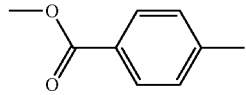

(V)
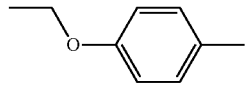

(VI)
$$—C_nH_{n+1}—$$

(VII)
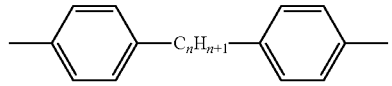

where n represents an integral number of 1 to 10.

7. The photo-alignment film according to claim 3, wherein $A^3$ and $A^4$ of the general formula (2) are independently selected from the group consisting of structural formulae (VIII) to (X) described below:

(VIII)
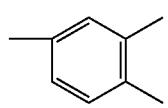

(IX)
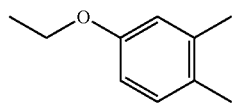

(X)
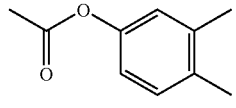

8. The photo-alignment film according to claim 6, wherein $A^1$ and $A^2$ of the general formula (1) are independently selected from the group consisting of the structural formulae (I), (II), and (III) and the general formulae (VI) and (VII).

9. The photo-alignment film according to claim 7, wherein $A^3$ and $A^4$ of the general formula (2) are each represented by the structural formula (VIII).

10. The photo-alignment film according to claim 1, wherein a molar ratio of the tetracarboxylic acid dianhydride containing an unsaturated bond and the diamine containing an unsaturated bond to a total amount of the raw materials of polyamic acid is 0.3 to 1.0.

11. A photo-alignment film, which is formed by imidization after alignment of a polyamic acid generated using at least a diamine and a tetracarboxylic acid dianhydride as raw materials by light irradiation in a predetermined direction, wherein:

the diamine and the tetracarboxylic acid dianhydride comprise one or both of one or more diamines selected from the group consisting of structural formulae (1-1) to (1-11) described below as component A of the diamine as the diamine and one or more tetracarboxylic acid dianhydrides selected from the group consisting of structural formulae (2-1) to (2-7) described below as component A of the tetracarboxylic acid dianhydride as the tetracarboxylic acid dianhydride; and the diamine and the tetracarboxylic acid dianhydride further comprise one or both of one or more diamines selected from the group consisting of general formulae (3-1) and (3-3) to (3-7) described below and a structural formula (3-2) described below as component B of the diamine as the diamine and one or more tetracarboxylic acid dianhydrides selected from the group consisting of a general formula (4-2) described below and structural formulae (4-1) and (4-3) to 4-7) described below as component B of the tetracarboxylic acid dianhydride as the tetracarboxylic acid dianhydride:

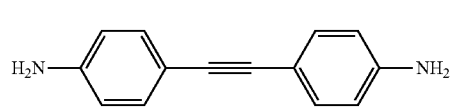

(1-1)

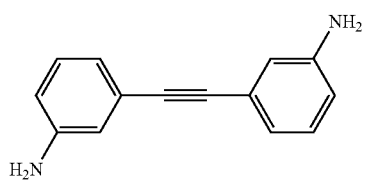

(1-2)

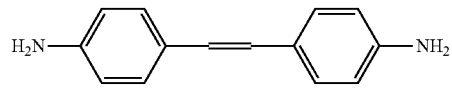

(1-3)

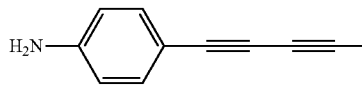

(1-4)

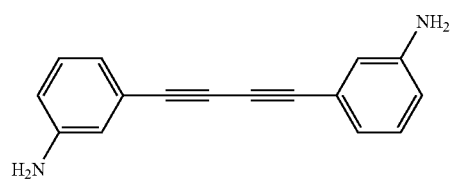

(1-5)

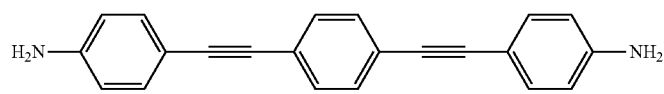

(1-6)

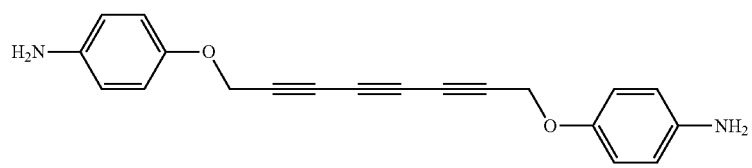

(1-7)

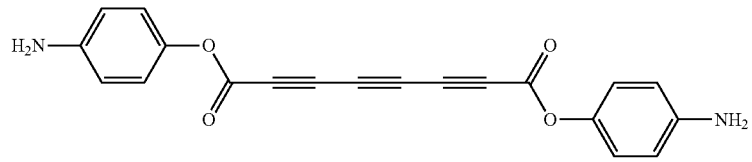

(1-8)

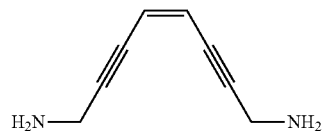

(1-9)

(1-10)

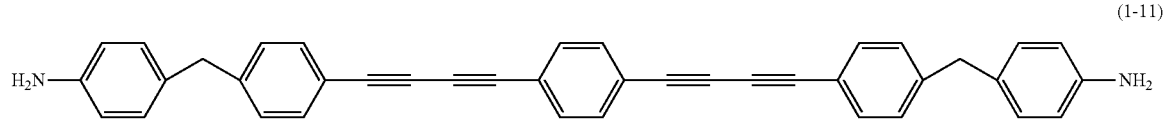

(1-11)

-continued
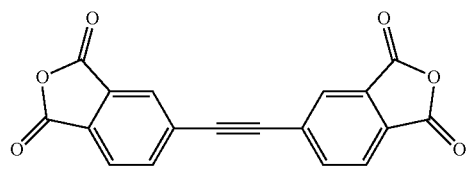 (2-1)
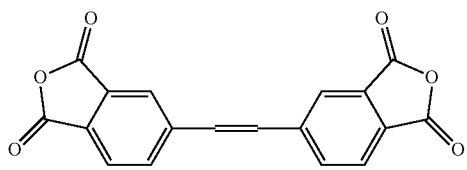 (2-2)
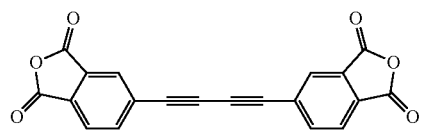 (2-3)
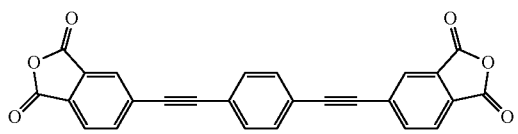 (2-4)
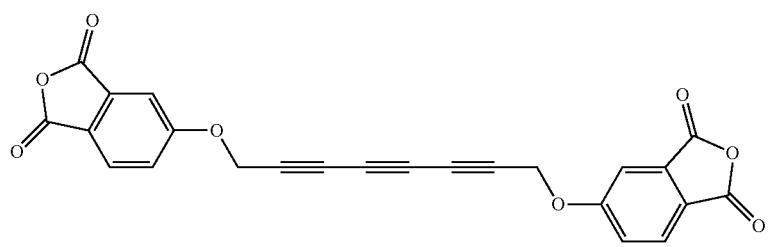 (2-5)
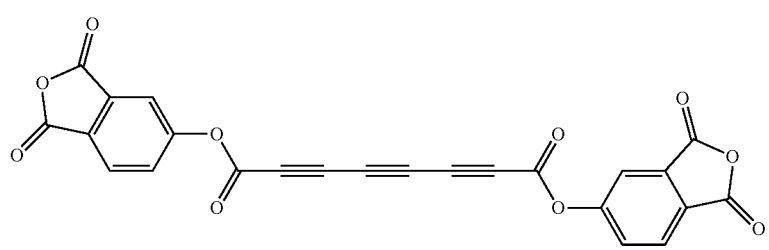 (2-6)
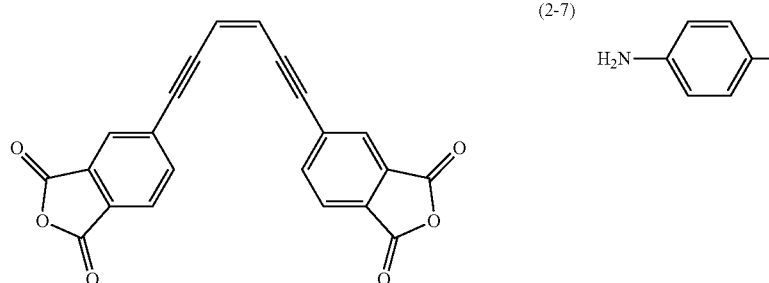 (2-7)
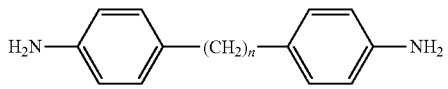 (3-1)
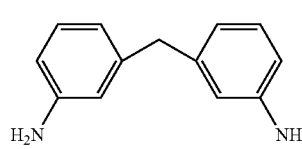 (3-2)
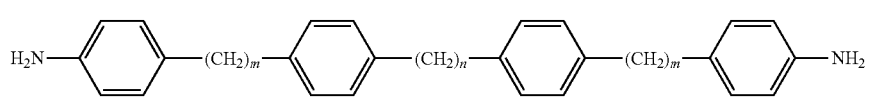 (3-3)
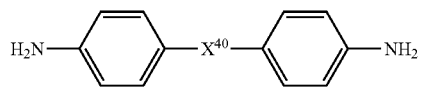 (3-4)
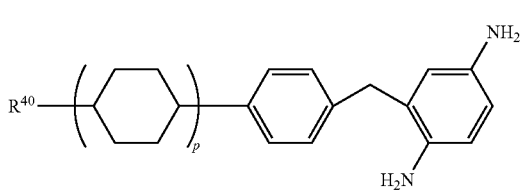 (3-5)

(3-6)

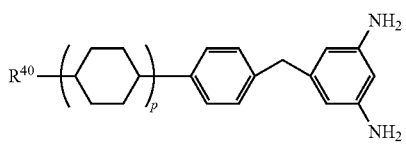

(3-7)

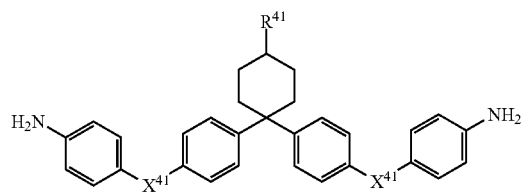

where $X^{40}$ represents —O— or —S—, $X^{41}$'s each independently represent —CH$_2$—, —CH$_2$CH$_2$—, or —O—, $R^{40}$ represents a hydrogen atom or an alkyl group having 1 to 20 carbon atoms, $R^{41}$ represents a hydrogen atom or an alkyl group having 1 to 10 carbon atoms, n represents an integral number of 1 to 6, m's each independently represent 1 or 2, and p represents an integral number of 0 to 2;

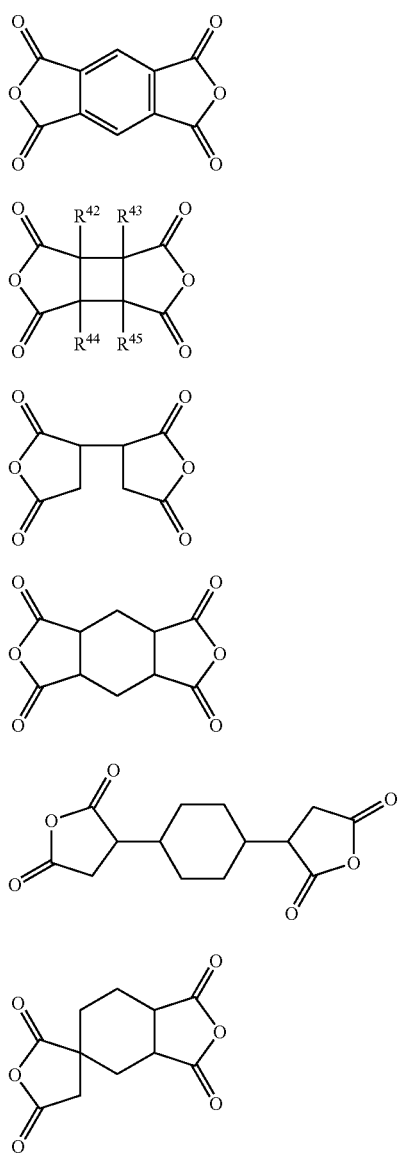

(4-1)
(4-2)
(4-3)
(4-4)
(4-5)
(4-6)

-continued (4-7)

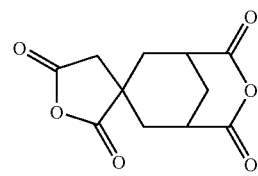

where $R^{42}$, $R^{43}$, $R^{44}$, and $R^{45}$ each independently represent a hydrogen atom or a methyl group.

12. The photo-alignment film according to claim 11, wherein the diamines represented by the general formulae (3-1) and (3-3) to (3-7) comprise diamines in which $X^{40}$ represents —O—, $X^{41}$'s each independently represent —CH$_2$— or —O—, $R^{40}$ represents a hydrogen atom or an alkyl group having 1 to 20 carbon atoms, $R^{41}$ represents an alkyl group having 1 to 10 carbon atoms, n represents an integral number of 1 to 4, m represents 1, and p represents an integral number of 0 to 2.

13. The photo-alignment film according to claim 1, wherein the photo-alignment film comprises a liquid crystal alignment film in which a polyimide main chain has an alignment index Δ determined from the following equation α of 0.5 or more:

$$\Delta = (|A\|| - A^\perp|)/\{(A\| + A^\perp) \times d\} \tag{$\alpha$}$$

where A∥ represents an integrated absorbance of an imide ring at a wave number of about 1,360 cm$^{-1}$ due to a C-N-C stretching vibration when linearly-polarized infrared light is applied perpendicular to a surface of the photo-alignment film so that a polarization direction of the infrared light is in parallel to an average alignment direction of the polyimide main chain, $A^\perp$ represents an integrated absorbance of the imide ring at a wave number of about 1,360 cm$^{-1}$ due to the C-N-C stretching vibration when the linearly-polarized infrared light is applied perpendicular to the surface of the photo-alignment film so that the polarization direction of the infrared light is in perpendicular to the average alignment direction of the polyimide main chain, and d represents a film thickness (nm) of the liquid crystal alignment film.

14. A liquid crystal display element comprising:
a pair of oppositely-arranged substrates;
electrodes formed on one or both of oppositely-facing surfaces of the pair of the substrates;
a liquid crystal alignment film formed on each of the oppositely-facing surfaces of the pair of substrates; and
a liquid crystal layer formed between the pair of the substrates,
wherein the liquid crystal alignment film comprises the photo-alignment film according to claim 1.

15. The photo-alignment film according to claim 2, wherein the tetracarboxylic acid dianhydride containing an unsaturated bond comprises a tetracarboxylic acid dianhydride where $A^3$ and $A^4$ in the general formula (2) each independently represent an aromatic ring having 6 to 20 carbon atoms or an aliphatic group having 1 to 20 carbon atoms and each may contain an oxy group and a carbonyl group, and T represents any group containing an unsaturated bond selected from the group consisting of the formulae (A) to (G).

* * * * *